(12) United States Patent  
Ishihara

(10) Patent No.: US 6,785,030 B2  
(45) Date of Patent: Aug. 31, 2004

(54) OPTICAL ELEMENT AND OPTICAL SCANNING DEVICE USING THE SAME

(75) Inventor: Keiichiro Ishihara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/057,239

(22) Filed: Jan. 28, 2002

(65) Prior Publication Data

US 2002/0114052 A1 Aug. 22, 2002

(30) Foreign Application Priority Data

Jan. 30, 2001 (JP) ......................................... 2001/021345

(51) Int. Cl.⁷ ............................................... G02B 26/08
(52) U.S. Cl. ...................... 359/212; 359/216; 359/205; 359/819; 347/259
(58) Field of Search ................................ 359/205–217, 359/811, 819; 347/256–261

(56) References Cited

U.S. PATENT DOCUMENTS 5,889,606 A * 3/1999 Toyoda ........................ 359/215

6,411,325 B1 * 6/2002 Matsushita et al. ......... 347/257  
6,512,533 B2 * 1/2003 Tajima et al. ................ 347/242

FOREIGN PATENT DOCUMENTS

| JP | 07-113973 | 5/1995 |
| JP | 09-073038 | 3/1997 |
| JP | 09-329755 | 12/1997 |
| JP | 3004064 | 11/1999 |

* cited by examiner

Primary Examiner—James Phan  
(74) Attorney, Agent, or Firm—Fitzpatrick, Cella, Harper & Scinto

(57) ABSTRACT

There are provided an optical element which can reduce an assembly cost by simplifying focus adjustment of the optical element, decreasing the number of parts required for the adjustment, and shortening the adjustment time, and an optical scanning device using the element. The optical element has a plurality of sets of positioning references for defining the position of the element in the optical axis direction. The plurality of sets of positioning references respectively define different positions in the optical axis direction.

32 Claims, 20 Drawing Sheets

OPTICAL ELEMENT AND OPTICAL SCANNING DEVICE USING THE SAME

BACKGROUND OF THE INVENTION

1. Field of the Invention

The present invention relates to an optical element and an optical scanning device using the element and, more particularly, to a scanning optical device which records image information by reflecting/deflecting a light beam emitted from a light source means using a deflection means, and optically scanning a scanning target surface via an imaging optical system and is suitable for an apparatus using an electrophotographic process, such as a laser beam printer or digital copying machine.

2. Related Background Art

Conventionally, in an optical scanning device used for a laser printer or the like, a light beam which is optically modulated in accordance with an image signal and emitted from a light source means is periodically deflected by a deflection means formed by, for example, a polygon mirror, and the light is focused into a spot on a photosensitive recording medium surface (photosensitive drum surface) by the second imaging optical system having an f-θ characteristic, thereby optically scanning the surface and recording image information.

FIG. 23 is a schematic view of the main part of a conventional optical scanning device.

Referring to FIG. 23, a divergent light beam emitted from a light source means 91 is converted into a substantially parallel light beam by a condenser lens (collimator lens) 82. The light beam width is limited by an aperture stop 83 and incident on a cylindrical lens 92. Of the substantially parallel light beam incident on the cylindrical lens 92, the light in a main scanning cross-section emerges without any change. The light in a sub scanning cross-section converges and is substantially formed into a linear image on a deflection/reflection surface 93a of a deflection means 93 comprising by a polygon mirror. The light beam reflected/deflected by the deflection/reflection surface 93a of the polygon mirror 93 is guided onto a recording medium surface (scanning target surface) 97 via a second imaging optical system 95 constituted by f-θ lenses 95a and 95b having an f-θ characteristic and a return mirror 96. By rotating the polygon mirror 93 by a driving means 94 at a substantially equiangular velocity, the recording medium surface 97 which is a photosensitive drum is optically scanned at a substantially constant speed. With this operation, a latent image based on a potential difference is formed.

The above f-θ lenses 95a and 95b are accurately positioned with respect to the optical path of a light beam reflected/deflected by the polygon mirror 93 and fixed on an optical frame (not shown) by a known method, e.g., bonding or spring pressure. For example, Japanese Laid-Open Patent Application Nos. 9-73038 and 9-329755 disclose a case where an f-θ lens is accurately positioned by bringing a positioning reference on the incident surface side of the f-θ lens into contact with a positioning member of an optical frame.

Japanese Patent No. 3004064 discloses a case where the incident and exit surfaces of an f-θ lens are simultaneously positioned by bringing the incident surface into contact with a incident-surface-side positioning member and bringing the exit surface into contact with an exit-surface-side positioning member. This prevents curvature of field on a recording medium surface or a deterioration in uniformity (f-θ characteristic) of scanning speed.

Japanese Laid-Open Patent Application No. 7-113973 discloses a case where focus adjustment on a recording medium surface is performed by mounting an f-θ lens on a moving means and moving it in the optical axis direction. In addition, a cylindrical lens is moved in the optical axis direction to set a spot diameter on a recording medium surface in the sub scanning direction to a desired value. At this position, the lens is fixed on an optical frame by a known method, e.g., bonding or spring pressure, thereby performing focus adjustment in the sub scanning direction.

Recently, there have been increasing demands for an increase in the resolution of an optical scanning device and a decrease in cost. With an increase in resolution, optical elements such as an f-θ lens and cylindrical lens need adjustment. For this purpose, new parts are required, and the adjustment time prolongs, resulting in an increase in adjustment cost.

SUMMARY OF THE INVENTION

It is an object of the present invention to provide an optical element which can reduce an assembly cost by simplifying focus adjustment of the optical element, decreasing the number of parts required for the adjustment, and shortening the adjustment time, and an optical scanning device using the element.

In one aspect of the invention, an optical element comprises a plurality of sets of positioning references for defining a position in an optical axis direction and said plurality of sets of positioning references define different positions in the optical axis direction.

In further aspect of the foregoing optical element, said positioning references of each set are formed on opposing surfaces.

In further aspect of the foregoing optical element, said positioning reference is formed into a stepped shape.

In further aspect of the foregoing optical element, said optical element has a focusing effect in one direction.

In another aspect of the invention, an optical scanning device comprises light source means, a first imaging optical system which focuses a light beam emitted from said light source means, deflection means for causing a deflection/reflection surface to reflect/deflect a light beam passing through said first imaging optical system to deflect the light beam as a deflected light beam at an equiangular velocity, and a second imaging optical system which optically scans the deflected light beam on a scanning target surface and forms the light beam into an image as a spot on the scanning target surface, and at least one of optical elements included in said first and second imaging optical systems has a plurality of sets of positioning references for defining a position of said optical element in the optical axis direction.

In further aspect of the foregoing optical scanning device, said positioning references of said optical element are formed on front and rear surfaces in the optical axis direction.

In further aspect of the foregoing optical scanning device, said optical element has a projection portion on an outer portion formed outside an effective portion, and surfaces of the projection portion which is located on front and rear sides in the optical axis direction form the positioning references.

In further aspect of the foregoing optical scanning device, an optical frame which houses said first imaging optical system or/and said second imaging optical system has a plurality of sets of positioning portions corresponding to the positioning references of said optical element, and an interval between the positioning portions of said optical frame in the optical axis direction of said optical element is larger than an interval between the positioning references of said optical element in the optical axis direction.

In further aspect of the foregoing optical scanning device, said optical element has a recess portion in an outer portion formed outside an effective portion, and surfaces of said recess portion which are located on front and rear sides in the optical direction form the positioning references.

In further aspect of the foregoing optical scanning device, an optical frame which houses said first imaging optical system or/and said second imaging optical system has a plurality of sets of positioning portions corresponding to the positioning references of said optical element, and an interval between the positioning portions of said optical frame in the optical axis direction of said optical element is smaller than an interval between the positioning references of said optical element in the optical axis direction.

In further aspect of the foregoing optical scanning device, said optical element is positioned to a position where one of said plurality of sets of positioning references for defining a position of said optical element in the optical axis direction is in contact with one of said plurality of positioning portions of said optical frame or a position where one of said plurality of sets of positioning references is not in contact with the positioning portions of said optical frame.

In further aspect of the foregoing optical scanning device, said optical element is placed between said plurality of sets of positioning portions of said optical frame.

In further aspect of the foregoing optical scanning device, the positioning reference also serves as a contact surface of a positioning tool.

In further aspect of the foregoing optical scanning device, said optical element is made of a synthetic resin material.

In further aspect of the foregoing optical scanning device, said optical element has a plurality of sets of positioning references, each constituted by two reference surfaces that define said optical element at the same position in the optical axis direction.

In further aspect of the foregoing optical scanning device, said optical element has a focusing effect only in one of a main scanning direction and a sub scanning direction.

In further aspect of the foregoing optical scanning device, said optical element has a focusing effect only in one of the main scanning direction and the sub scanning direction, and a positioning reference of said optical element is formed into a stepped shape in a direction in which said optical element has no focusing effect.

In still another aspect of the invention, an optical scanning device comprises light source means, a first imaging optical system which focuses a light beam emitted from said light source means, deflection means for causing a deflection/reflection surface to reflect/deflect a light beam passing through said first imaging optical system to deflect the light beam as a deflected light beam at an equiangular velocity, and a second imaging optical system which optically scans the deflected light beam on a scanning target surface and forms the light beam into an image as a spot on the scanning target surface, wherein one of lenses constituting said first and second imaging optical systems has, on light incident and exit surfaces of said lens, positioning references for defining a position of said lens in the optical axis direction.

In further aspect of the foregoing optical scanning device, the device further comprises an optical frame which houses said first imaging optical system or/and said second imaging optical system, and said optical frame has positioning portions corresponding to the positioning references of said lens on front and rear sides in a direction of an optical axis of said lens, and an interval between the positioning portions of said optical frame in the direction of the optical axis of said lens is larger than an interval between the positioning references of said lens in the optical axis direction.

In further aspect of the foregoing optical scanning device, said lens is positioned such that the positioning reference which is formed on a light incident surface side of said lens and defines a position in the direction of the optical axis of said lens is in contact with the positioning portion of said optical frame on the light incident surface side, positioned such that the positioning reference which is formed on the light exit surface side and defines a position in the direction of the optical axis of said lens is in contact with the positioning portion of said optical frame on the light exit surface side, or positioned between the positioning portions on the light incident and exit surface sides without contacting the positioning portions of said optical frame.

In further aspect of the foregoing optical scanning device, said lens is made of a synthetic resin material.

In further aspect of the foregoing optical scanning device, said lens comprises, on the light incident and exit surface sides of said lens, two pairs of positioning references for defining a position in the direction of the optical axis of said lens.

In further aspect of the foregoing optical scanning device, said lens has a focusing effect only in one of the main scanning direction and the sub scanning direction.

In further aspect of the foregoing optical scanning device, said lens is formed by a composite lens obtained by integrating a cylindrical lens having a focusing effect only in the sub scanning direction and a synchronous detection lens which guides a light beam to synchronous detection means, and the positioning reference positions said composite lens in a direction parallel to the direction of the optical axis of the synchronous detection lens of said composite lens.

In still another aspect of the invention, an image forming apparatus comprises the foregoing optical scanning device, a photosensitive member placed on the scanning target surface, a developing unit which develops an electrostatic latent image formed on said photosensitive member by a light beam scanned by said optical scanning device into a toner image, a transfer unit which transfers the developed toner image onto a transfer material, and a fixing unit which fixes the transferred toner image on the transfer material.

In still another aspect of the invention, an image forming apparatus comprises the foregoing optical scanning device, and a printer controller which converts code data input from an external device into an image signal and inputs the signal to said optical scanning device.

DETAILED DESCRIPTION OF THE PREFERRED EMBODIMENTS

First Embodiment

An embodiment of the present invention will be described with reference to the accompanying drawings.

Figure 1:
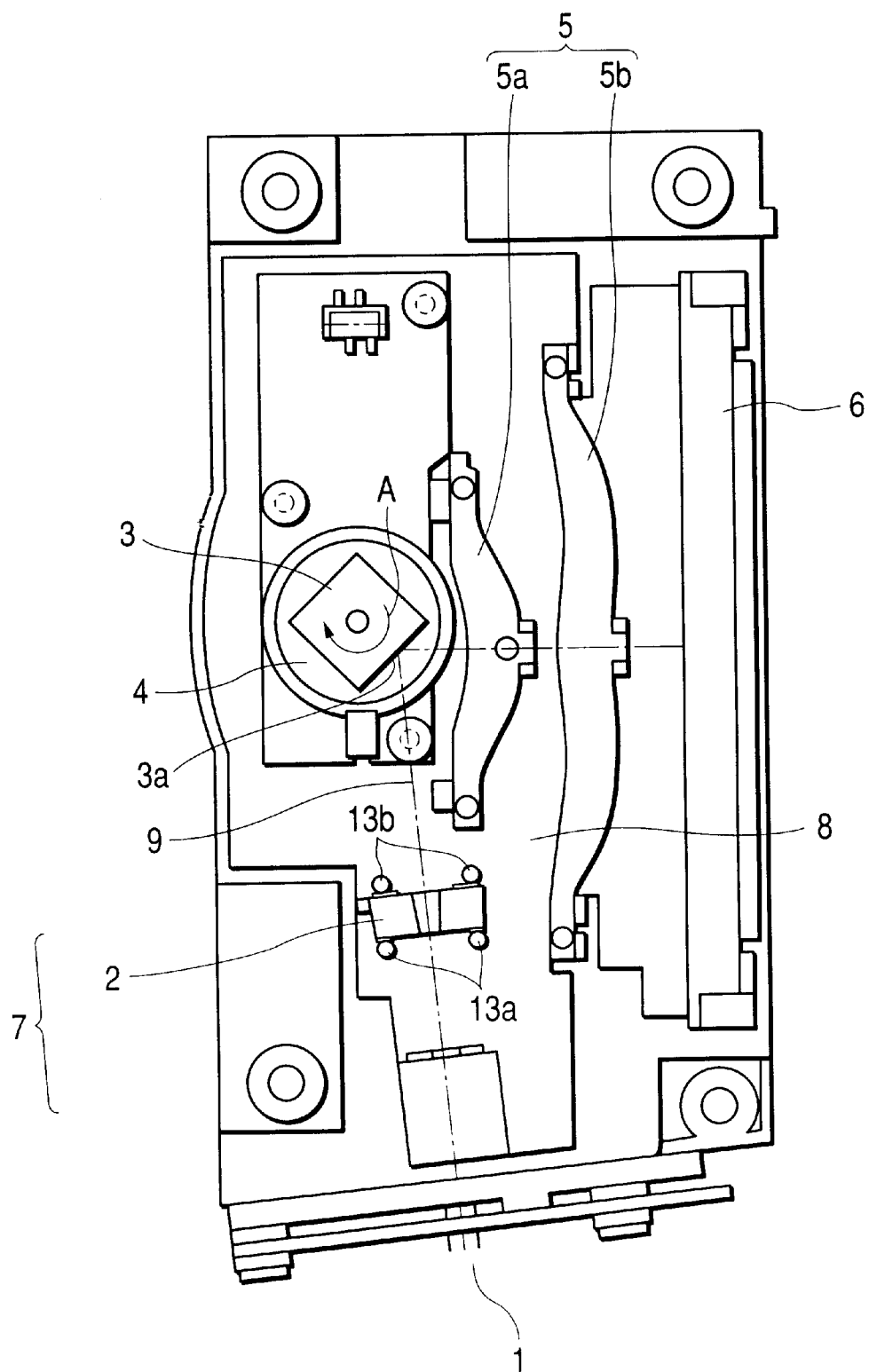
FIG. 1 is a main scanning cross-sectional view of an optical scanning device according to the first embodiment of the present invention.

FIG. 1 is a sectional view (main scanning cross-sectional view) of the main part of an optical scanning device according to the first embodiment of the present invention in the main scanning direction. In this case, the main scanning direction is the direction in which a light beam is deflected/scanned by a deflection means, and the sub scanning direction is a direction perpendicular to the optical axis and the main scanning direction.

Referring to FIG. 1, a light source means 1 is formed by, for example, a semiconductor laser. A cylindrical lens (cylinder lens) 2 is made of a synthetic resin. This lens has a predetermined refraction power only in the sub scanning direction and forms a light beam passing through an aperture stop (not shown) into an almost linear image on a deflection surface 3a of a light deflector 3 (to be described later) within a sub scanning cross-section.

Note that each of the cylindrical lens 2, a collimator lens (not shown), and an aperture stop (not shown) is one element of a first imaging optical system 7.

The light deflector 3 is a deflection means which has a deflection surface near the imaging position of the cylindrical lens and reflects/deflects an incident light beam in the main scanning direction. This means is, for example, formed by a polygon mirror (rotating polyhedral mirror) and is rotated by a driving means 4 such as a motor at a constant speed in the direction indicated by an arrow A in FIG. 1.

A second imaging optical system (f-θ lens system) is comprised of two f-θ lenses 5a and 5b made of a synthetic resin. This system forms a light beam based on image information and reflected/deflected by the polygon mirror 3 into an image on a photosensitive drum surface (not shown) as a recording medium surface via a return mirror 6 and corrects a surface inclination of the deflection/reflection surface 3a of the polygon mirror 3 within a sub scanning cross-section.

To form a linear image formed near the polygon mirror 3 onto the photosensitive drum, each of the f-θ lenses 5a and 5b is formed by a toric lens having different refraction powers in the main scanning direction and the sub scanning direction.

The return mirror 6 returns a light beam passing through the second imaging optical system 5 to the photosensitive drum serving as a recording medium. An optical frame 8 (optical box) houses the first imaging optical system 7 and second imaging optical system 5.

In this embodiment, the divergent light beam emitted from the semiconductor laser 1 is converted into a substantially parallel light beam by a collimator lens (not shown). The light beam (light amount) is then limited by an aperture stop (not shown) and strikes the cylindrical lens 2. Of the substantially parallel light beam incident on the cylindrical lens 2, the light beam within a main scanning cross-section exits without any change. On the other hand, the light beam within a sub scanning cross-section converges and forms an almost linear image (a linear image elongated in the main scanning direction) on the deflection/reflection surface 3a of the polygon mirror 3. The light beam reflected/deflected by the deflection/reflection surface 5a of the polygon mirror 5 is guided onto the photosensitive drum surface (not shown) via the f-θ lenses 5a and 5b and return mirror 6. By rotating the polygon mirror 3 in the direction indicated by the arrow A, this light beam is scanned on the photosensitive drum surface. With this operation, an image is recorded on the photosensitive drum surface serving as a recording medium.

Figure 2A:
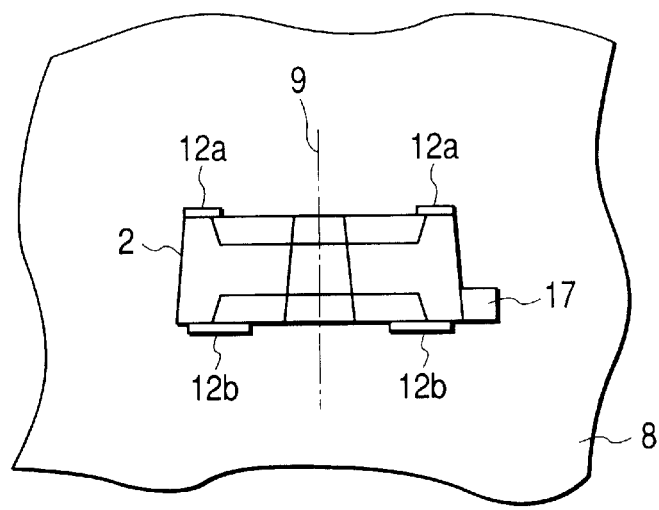
FIGS. 2A, 2B, 2C and 2D are schematic views of the main part of a cylindrical lens according to the first embodiment of the present invention.
Figure 2B:
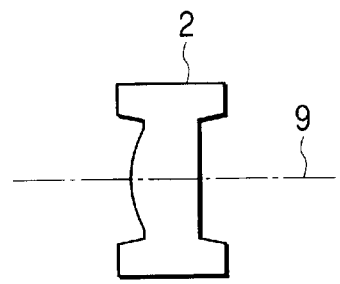
Figure 2C:
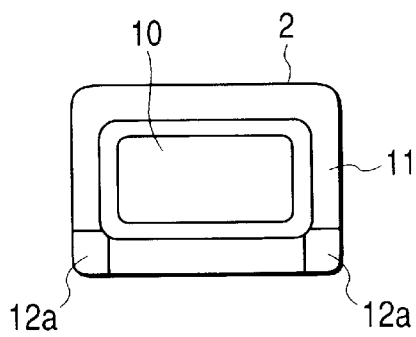
Figure 2D:
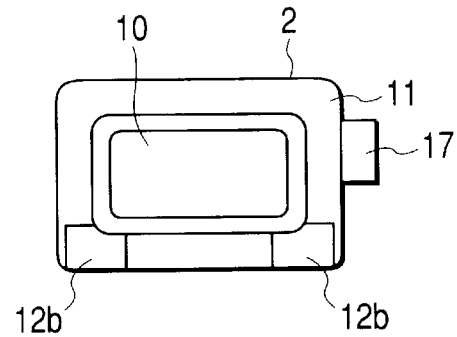

The cylindrical lens 2 in this embodiment will be described below with reference to FIGS. 2A to 2D. FIG. 2A is a sectional view of the main part of the cylindrical lens 2 in the main scanning direction. FIG. 2B is a sectional view of the cylindrical lens 2 in the sub scanning direction including an optical axis 9. FIG. 2C is a view on the incident surface (light incident surface) side of the cylindrical lens 2. FIG. 2D is a view on the exit surface side (light exist surface) of the cylindrical lens.

The cylindrical lens 2 is a plastic lens having a focusing power only in the sub scanning direction. The incident surface of this lens is a cylindrical surface having a flat surface in the main scanning direction and a surface bulging out toward the light source means in the sub scanning direction. The exit surface of the lens is a diffraction surface obtained by forming linear diffraction grating elements parallel to the main scanning direction on a flat surface at a pitch continuously changing in the sub scanning direction. Effective portions 10 are respectively formed on the incident and exit surfaces. Positioning references 12a and 12b for defining a position in the direction of the optical axis 9 are respectively formed on the incident surface side and exit surface side of an outer portion 11 formed outside the effective portions 10. The cylindrical lens 2 can be placed at a desired position with high precision by using the positioning references 12a and 12b on either side. Two pairs of positioning references 12a and 12b are placed side by side in the main scanning direction to allow the cylindrical lens 2 to be accurately restricted even with respect to rotational eccentricity around an axis parallel to the sub scanning direction.

One positioning reference 12a is formed by one reference surface or a plurality of reference surfaces for defining the same position in the direction of the optical axis 9. One positioning reference 12a and one positioning reference 12b constitute two positioning references.

Figure 3:
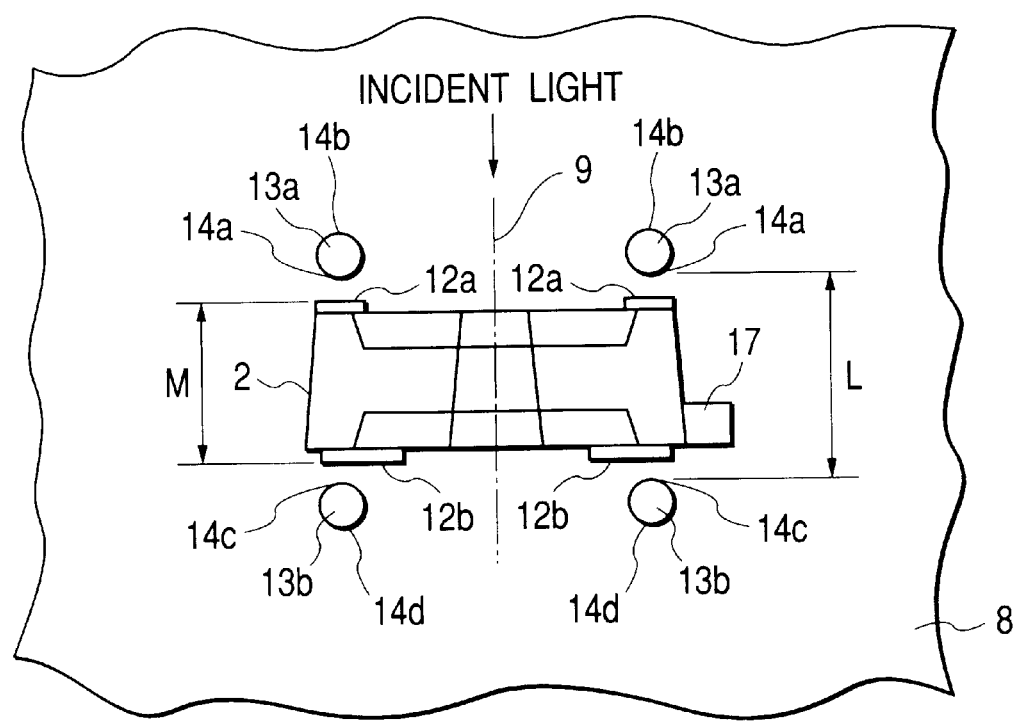
FIG. 3 is a schematic main scanning cross-sectional view of the main part of the optical scanning device according to the first embodiment of the present invention.

FIG. 3 is a sectional view of the main part of the cylindrical lens 2 according to this embodiment in the main scanning direction. The same reference numerals as in FIG. 2A denote the same elements in FIG. 3.

Referring to FIG. 3, positioning members 13a and 13b are integrated with the optical frame 8 and are arranged in correspondence with the positioning references 12a and 12b. Two of positioning portions 14a, 14b, 14c, and 14d are formed on each of the positioning members 13a and 13b at the front and back sides along the direction of the optical axis 9.

Note that each of the positioning members 13a and 13b has an arbitrary shape, e.g., a cylindrical shape or pyramidal shape.

Figure 4A:
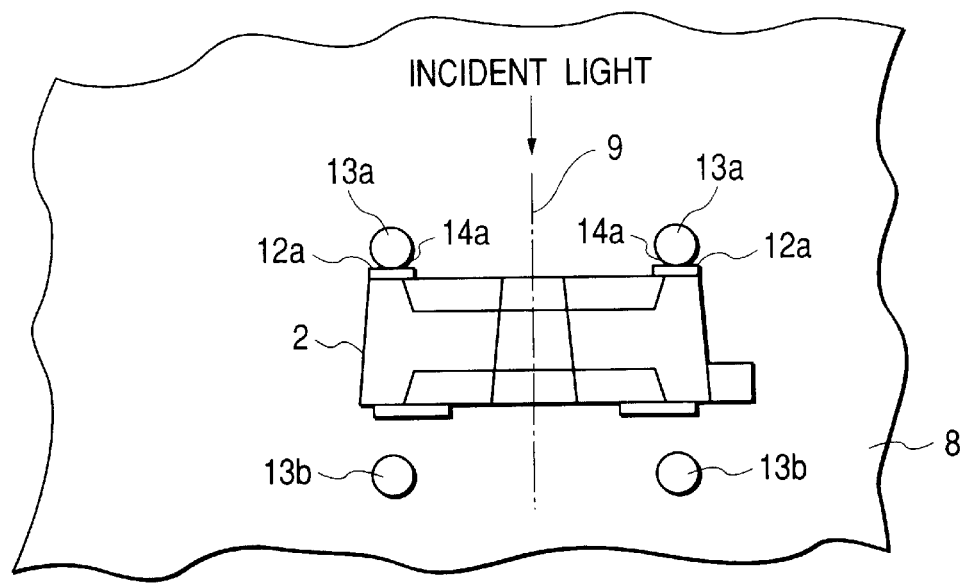
FIGS. 4A and 4B are schematic views showing adjustment positions in the first embodiment of the present invention.
Figure 4B:
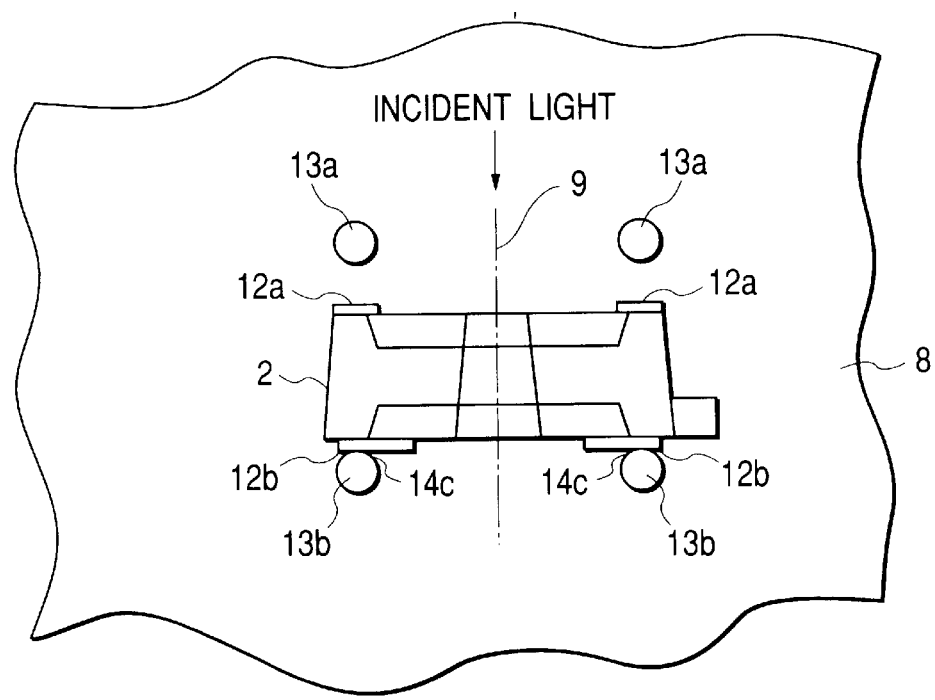

An interval L between the positioning portions 14a and 14c in the direction of the optical axis 9 is 3.7 mm, which is larger than interval M=3.3 mm between the positioning references 12a and 12b in the direction of the optical axis 9 (L>M). In this case, if the cylindrical lens 2 is positioned by bringing the positioning references 12a on the incident surface side of the cylindrical lens 2 into contact with the positioning portions 14a of the optical frame 8 on the light source means side as shown in FIG. 4A, the cylindrical lens 2 can be adjusted toward the polygon mirror side (exit surface side) by 0.4 mm up to the position where the positioning references 12b on the exit surface side of the cylindrical lens 2 are brought into contact with the positioning portions 14c of the optical frame 8 on the polygon mirror side, as shown in FIG. 4B. This makes it possible to adjust a spot diameter on a recording medium surface in the sub scanning direction to a desired value.

If the cylindrical lens 2 is placed between the positioning members 13a and the positioning members 13b which determine the positions of the positioning portions 14a, 14b, 14c, and 14d, which are arranged in the optical axis direction, in the direction of the optical axis 9, the lens can be quickly positioned at an arbitrary position between these positioning members in the direction of the optical axis 9.

A case where the cylindrical lens 2 is placed at a position where it does not come into contact with the positioning portions 14a, 14b, 14c, and 14d of the optical frame 8 by using a positioning tool 15 will be described next with reference to FIG. 5. The same reference numerals as in FIG. 3 denote the same elements in FIG. 5.

Figure 5:
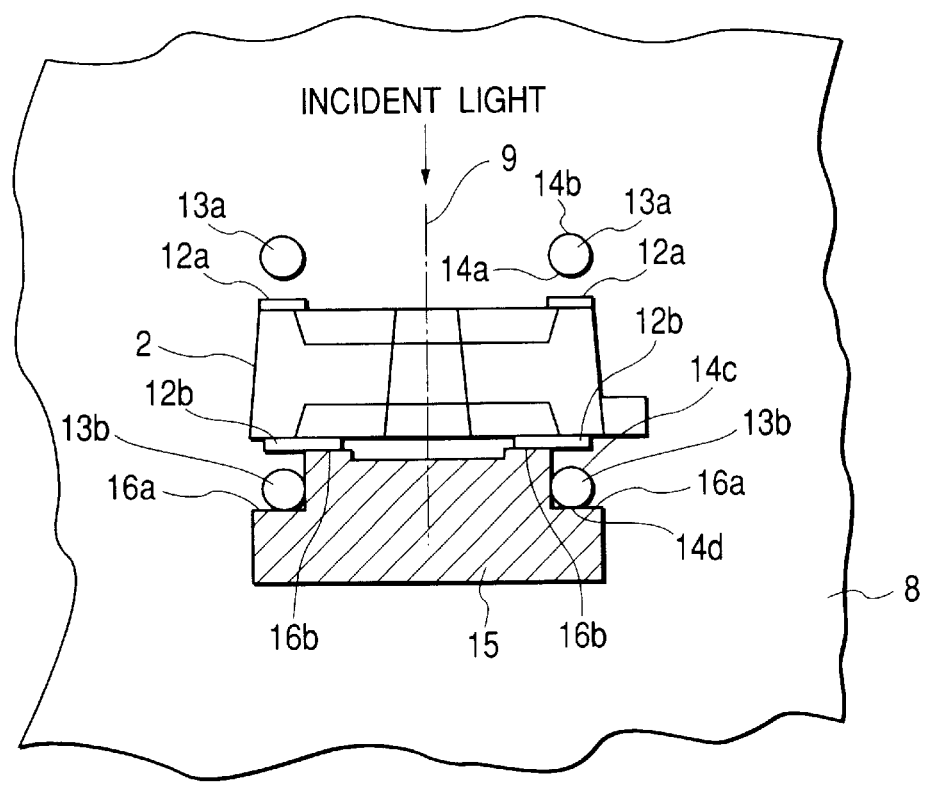
FIG. 5 is a schematic view showing a positioning method for the initial adjustment position in the first embodiment of the present invention.

The positioning tool 15 in FIG. 5 has reference surfaces (contact surfaces) 16a as positioning references for defining a position relative to the optical frame 8. The positioning tool 15 is placed on the optical frame 8 with high precision. The positioning tool 15 also has reference surfaces 16b that come into contact with the positioning references 12b of the cylindrical lens 2, thus allowing the positioning tool 15 and cylindrical lens 2 to be accurately positioned. This makes it possible to place the cylindrical lens 2 between the two pairs of positioning members 13a and 13b with high precision without contact with the positioning portions 14a, 14b, 14c, and 14d.

Figure 6A:
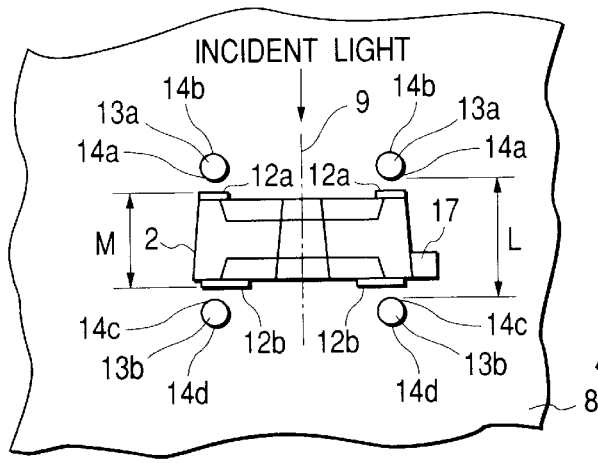
FIGS. 6A, 6B, 6C, 6D and 6E are schematic views showing adjustment positions in the first embodiment of the present invention.
Figure 6B:
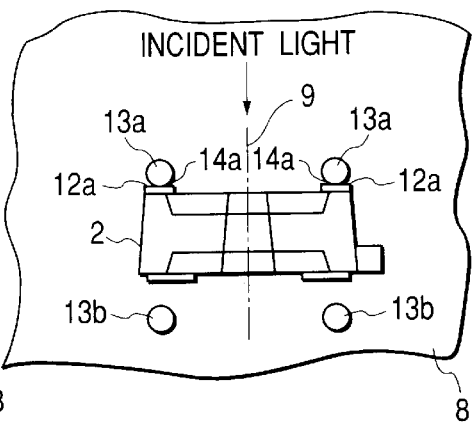
Figure 6C:
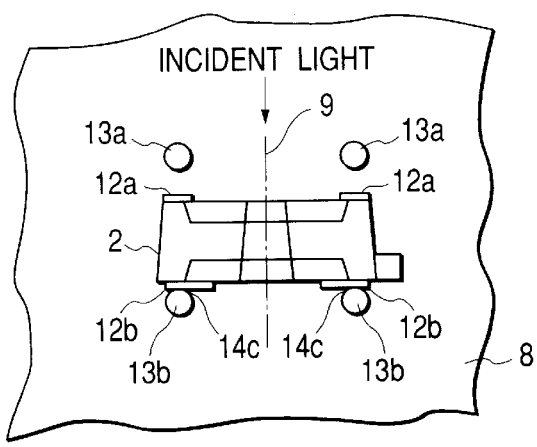

Assume that the state shown in FIG. 6A is the initial state (nominal position) in which the cylindrical lens 2 is placed on the optical frame 8. After the cylindrical lens 2 is positioned to the initial position, the positioning tool (not shown) is removed from the optical frame 8. This allows the cylindrical lens 2 to be adjusted toward the light source means and polygon mirror by 0.2 mm each. This makes it possible to accurately position the cylindrical lens 2 to one of the three positions, i.e., the initial position shown in FIG. 6A, the adjustment position shown in FIG. 6B at which the positioning references 12a on the incident surface side are in contact with the positioning portions 14a, of the positioning members 13a on the light source means side, which are located on the rear side in the direction of the optical axis 9, and the adjustment position shown in FIG. 6C at which the positioning references 12b on the exit surface side are in contact with the positioning portions 14c, of the positioning members 13b on the polygon mirror side, which are located on the front side in the direction of the optical axis 9, thereby accurately adjusting a spot diameter on the recording medium surface in the sub scanning direction.

This embodiment can greatly shorten the adjustment time as compared with the conventional adjustment method in which the cylindrical lens is not placed at a predetermined position, and hence can reduce the assembly cost. In addition, in adjusting the position of the cylindrical lens 2 in the optical axis direction, there is no need to use any another means such as a slide plate mounted on the optical scanning device, and high-precision adjustment can be realized by using only a positioning tool that can be reused. This allows a reduction in cost. This embodiment can therefore provide a high-resolution, inexpensive optical scanning device.

Figure 6D:
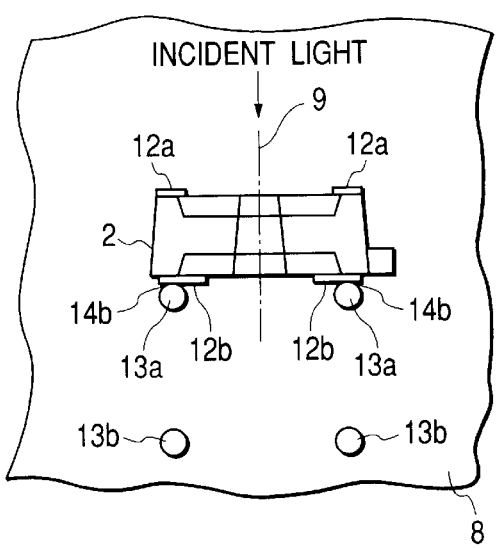
Figure 6E:
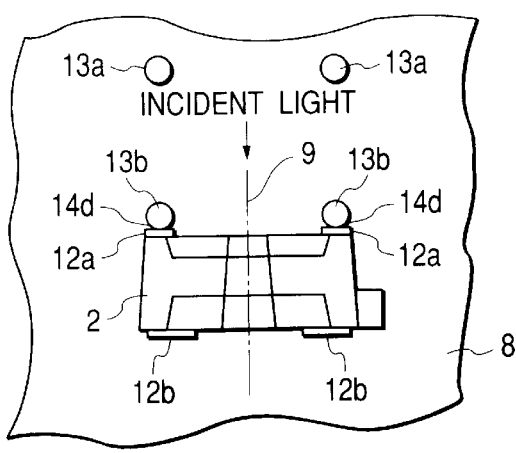

By using five adjustment positions, i.e., the three positions described above plus the adjustment position shown in FIG. 6D at which the positioning references 12b on the exit surface side are in contact with the positioning portions 14b, of the positioning members 13a on the light source means side, which are located on the front side in the direction of the optical axis 9, and the adjustment position shown in FIG. 6E at which the positioning references 12a on the incident surface side are in contact with the positioning portions 14d, of the positioning members 13b on the polygon mirror side, which are located on the rear side in the direction of the optical axis 9, the cylindrical lens 2 can be accurately placed at two positions on the front and rear sides, each, in the optical axis direction around the initial position shown in FIG. 6A. This makes it possible to improve the adjustment precision and bring a spot diameter on the recording medium surface in the sub scanning direction near to a desired value.

As described above, according to this embodiment, the cylindrical lens 2 can be adjusted easily and accurately, and the adjustment time can be shortened. In addition, the amount of protrusion from the outer portion formed outside the effective portions is suppressed in injection molding, and hence stable molding can be done. In addition, in this embodiment, since the position where the cylindrical lens 2 is placed by using the positioning tool is set as the initial position, the number of adjustment positions can be increased by one, thus further improving the adjustment precision. Furthermore, the cylindrical lens 2 can be symmetrically adjusted on both the front side and the rear side in the optical axis direction. Moreover, according to this embodiment, the cylindrical lens 2 can be accurately placed not only at a position in the optical axis direction but also with respect to rotational eccentricity around a rotation axis parallel to the sub scanning direction, and can be adjusted independently in the main scanning direction and sub scanning direction.

Second Embodiment

The second embodiment of the present invention will be described next.

This embodiment differs from the first embodiment described above in that the positioning references 12a and 12b of the cylindrical lens 2 in the direction of the optical axis 9, which constitute part of the first imaging optical system 7, are changed, and the positions of the positioning members 13a and 13b of the optical frame 8 are changed. Other arrangements and optical functions are the same as those of the first embodiment, and hence the second embodiment has the same effects as those of the first embodiment.

Figure 7A:
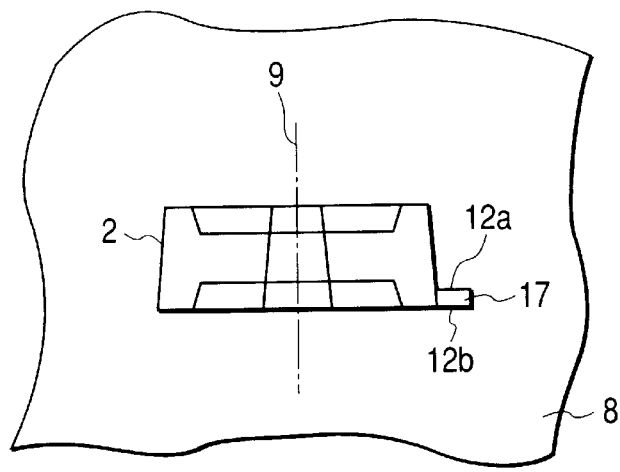
FIGS. 7A, 7B, 7C and 7D are schematic views of the main part of a cylindrical lens according to the second embodiment of the present invention.
Figure 7B:
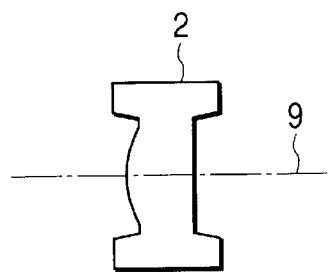
Figure 7C:
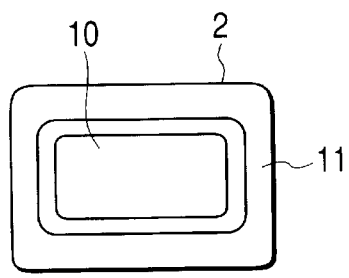
Figure 7D:
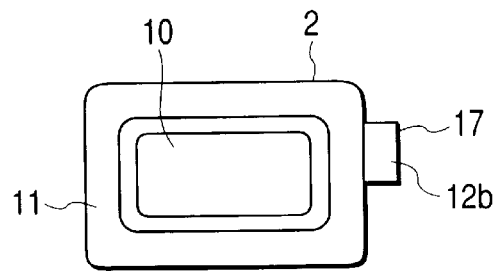

A cylindrical lens 2 according to this embodiment will be described below with reference to FIGS. 7A to 7D. FIG. 7A is a sectional view of the main part of the cylindrical lens 2 in the main scanning direction. FIG. 7B is a sectional view of the main part of the cylindrical lens 2 in the sub scanning direction including an optical axis 9. FIG. 7C is a view on the incident surface side of the cylindrical lens 2. FIG. 7D is a view on the exit surface side of the cylindrical lens 2. The same reference numerals as in FIG. 2A to 2D denote the same elements in FIGS. 7A to 7D.

In this embodiment, the front surface (incident surface side) and rear surface (exit surface side) of a protruding portion (projection portion) 17 formed on a side surface of the cylindrical lens 2 are respectively positioning references 12a and 12b in the direction of the optical axis 9 of the cylindrical lens 2. In this case, each of the positioning references 12a and 12b serves as one positioning reference. The cylindrical lens 2 is a plastic lens. The protruding portion 17 also serves as a gate required when the cylindrical lens 2 is formed by injection molding.

Figure 8:
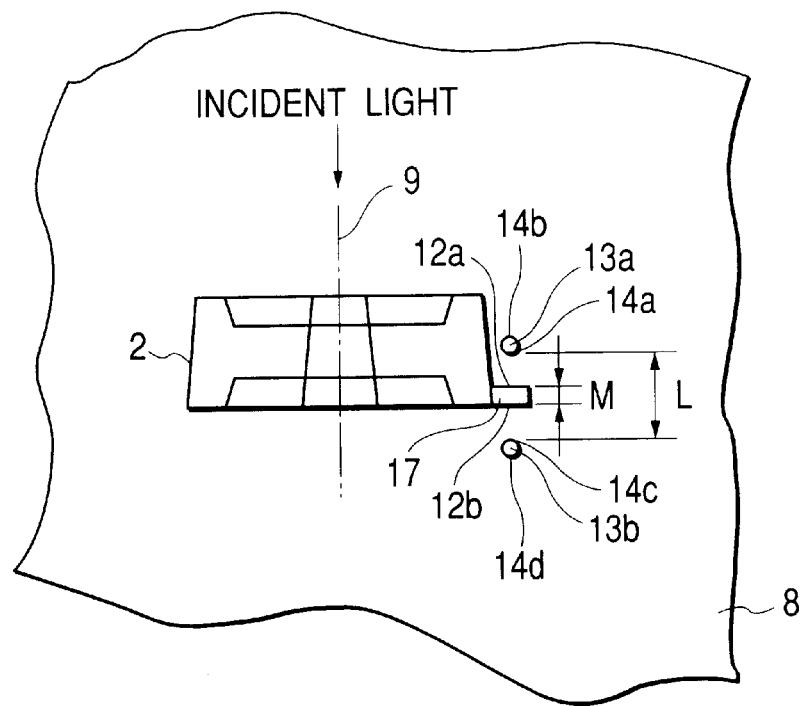
FIG. 8 is a schematic main scanning cross-sectional view of an optical scanning device according to the second embodiment of the present invention.
Figure 9:
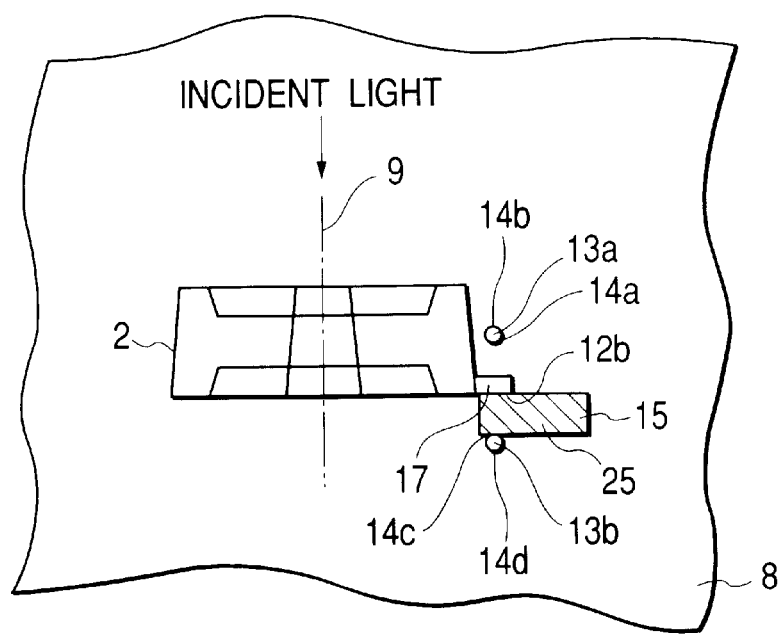
FIG. 9 is a schematic view showing a positioning method for the initial adjustment position in the second embodiment of the present invention.

FIG. 8 is a sectional view of the main part of the cylindrical lens 2 in the main scanning direction. The same reference numerals as in FIGS. 7A to 7D denote the same elements in FIG. 8.

Referring to FIG. 8, positioning members 13a and 13b are integrated with an optical frame 8, and are formed on the front and rear sides, one each, along the direction of the optical axis 9 of the cylindrical lens 2. Two of positioning portions 14a, 14b, 14c, and 14d are formed on each of the positioning members 13a and 13b at the front and back sides along the direction of the optical axis 9. An interval L between the positioning portions 14a and 14c in the direction of the optical axis 9 is 2.5 mm, which is larger than interval M=0.5 mm between the positioning references 12a and 12b in the direction of the optical axis 9 (L>M).

A case where the cylindrical lens 2 is placed at a position where it does not come into contact with the positioning portions 14a, 14b, 14c, and 14d of the optical frame 8 by using a positioning tool 15 will be described next.

In this embodiment, as the positioning tool 15, a spacer (foil) 25 is used. The distance between the positioning reference 12b of the cylindrical lens 2 on the exit surface side and the positioning portion 14c, of the polygon-mirror-side positioning member 13b of the optical frame 8, which is located on the front side in the direction of the optical axis 9 is defined by inserting the foil 25 between them. With this arrangement, the cylindrical lens 2 can be placed with high precision between the two positioning members 13a and 13b without any contact with the positioning portions 14a, 14b, 14c, and 14d of the optical frame 8.

Figure 10A:
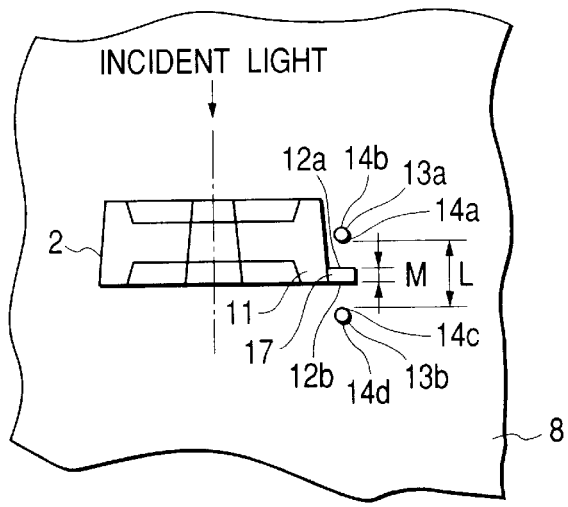
FIGS. 10A, 10B, 10C, 10D and 10E are schematic views showing adjustment positions in the second embodiment of the present invention.

Assume that the state shown in FIG. 10A is the initial state (nominal position) in which the cylindrical lens 2 is placed on the optical frame 8. After the cylindrical lens 2 is positioned to the initial position, a positioning tool (not shown) is removed from the optical frame 8.

Figure 10B:
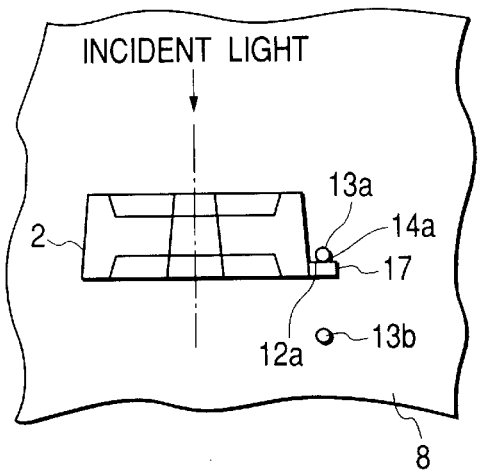
Figure 10C:
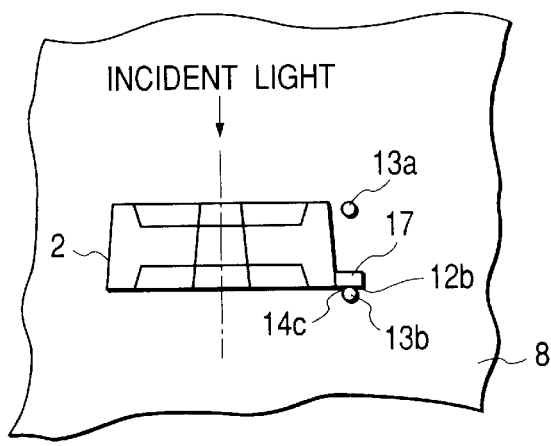
Figure 10D:
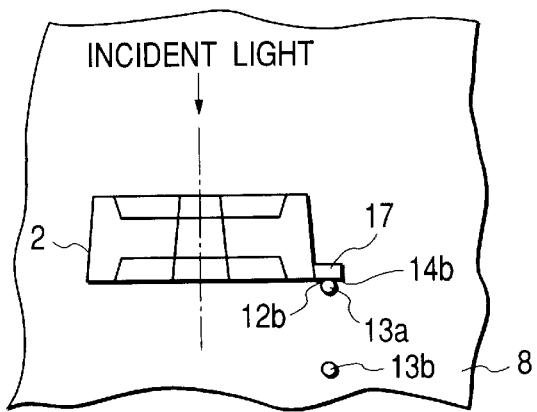
Figure 10E:
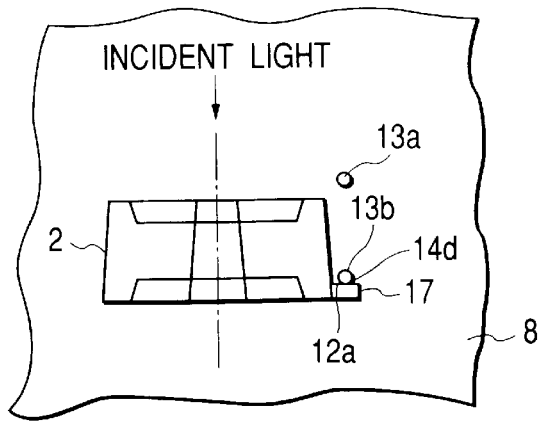

The positioning members 13a and 13b of the optical frame 8 respectively have the positioning portions 14a, 14b, 14c, and 14d on the two sides in the direction of the optical axis 9. Each of the positioning members 13a and 13b has a cylindrical shape with a circular bottom surface having a diameter of 1 mm. With this arrangement, the cylindrical lens 2 can be positioned to five adjustment positions, i.e., the initial position shown in FIG. 10A, the position shown in FIG. 10B at which the positioning reference 12a is in contact with the positioning portion 14a, the position shown in FIG. 10C at which the positioning reference 12b is in contact with the positioning portion 14c, the position shown in FIG. 10D at which the positioning reference 12b is in contact with the positioning portion 14b, and the position shown in FIG. 10E at which the positioning reference 12a is in contact with the positioning portion 14d. This makes it possible to equidistantly adjust the cylindrical lens 2 by 1.0 mm and 2.0 mm on the light source means side and polygon mirror side, respectively.

Assume that five or more adjustment positions are to be set by bringing the two sides of each of the positioning references 12a and 12b into contact with the positioning portions 14a, 14b, 14c, and 14d on the two sides of each of the positioning members 13a and 13b. In this case, the protruding portion 17 is formed on the outer portion 11 of the cylindrical lens 2 as in this embodiment, and the positioning references 12a and 12b are formed on the front and rear surfaces of the protruding portion 17 in the direction of the optical axis 9 instead of forming the positioning references 12a and 12b on the incident and exit surfaces of the cylindrical lens 2, thereby setting the adjustment pitch to a desired value. This makes it possible to adjust a spot diameter on a recording medium surface in the sub scanning direction with high precision.

In addition, according to the optical scanning device of this embodiment, since the cylindrical lens 2 having a focusing function only in the sub scanning direction is adjusted, only the spot diameter in the sub scanning direction can be adjusted without any correlation with the main scanning direction.

As described above, in this embodiment, the number of adjustment positions for the cylindrical lens 2 is increased from the optical frame 8 side, and the pitch of adjustment positions can be set to a fine pitch regardless of the outer dimension of the cylindrical lens 2. This allows high-precision adjustment.

Note that in this embodiment, the positioning references 12a and 12b of the cylindrical lens 2 in the direction of the optical axis 9 are formed on a side surface of the cylindrical lens 2. However, the present invention is not limited to this. For example, they may be formed on the upper or lower surface of the cylindrical lens 2. With this arrangement, the same effects as those of this embodiment can be obtained. In addition, in this embodiment, the positioning references 12a and 12b are formed on a side surface of the protruding portion 17 of the gate. However, such an arrangement is not always required.

Third Embodiment

The third embodiment of the present invention will be described next.

This embodiment differs from the first embodiment in that the positioning references 12a and 12b (in the direction of the optical axis 9) of the cylindrical lens 2 as a part of the first imaging optical system are changed, and the position of the positioning member 13a of the optical frame 8 is changed. Other arrangements and optical functions are the same as those of the first embodiment, and hence the third embodiment has the same effects as those of the first embodiment.

Figure 11:
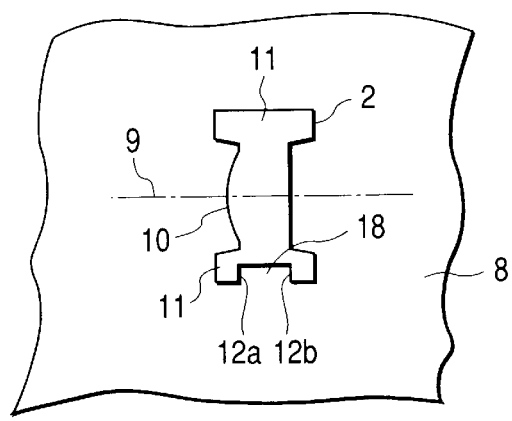
FIG. 11 is a schematic sub scanning cross-sectional view of an optical scanning device according to the third embodiment of the present invention.

FIG. 11 is a sectional view of the main part of a cylindrical lens 2 according to this embodiment in the main scanning direction.

Referring to FIG. 11, the cylindrical lens 2 has a recess portion 18 in the lower surface of an outer portion 11 formed outside effective portions 10 on the drawing surface. A front-side positioning reference 12a is formed on a side surface of the recess portion 18 which is located on the front side in the direction of an optical axis 9. A rear-side positioning reference 12b is formed on a side surface of the recess portion 18 which is located on the rear side in the direction of the optical axis 9.

As in the second embodiment, in this embodiment, by using a positioning tool (not shown), the cylindrical lens 2 is positioned to the initial position where it is not in contact with positioning portions 14a and 14b of an optical frame 8.

Figures 12A, 12B:
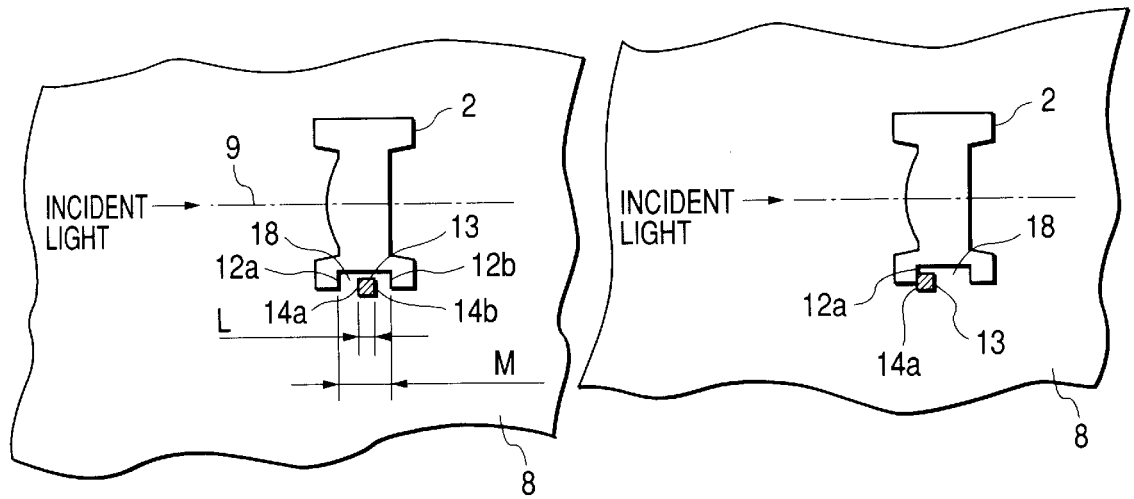
FIGS. 12A, 12B and 12C are schematic views showing adjustment positions in the third embodiment of the present invention.

FIG. 12A shows the initial position (first adjustment position). As shown in FIG. 12A, a positioning member 13 of the optical frame 8 is so placed as to be located between the positioning references 12a and 12b. The positioning portions 14a and 14b are formed on the front and rear surfaces of the positioning member 13. An interval L between the positioning portions 14a and 14b in the direction of the optical axis 9 is 1.0 mm, which is smaller than interval M=3.0 mm between the positioning references 12a and 12b of the cylindrical lens 2 in the direction of the optical axis 9 (L<M).

Figure 12C:
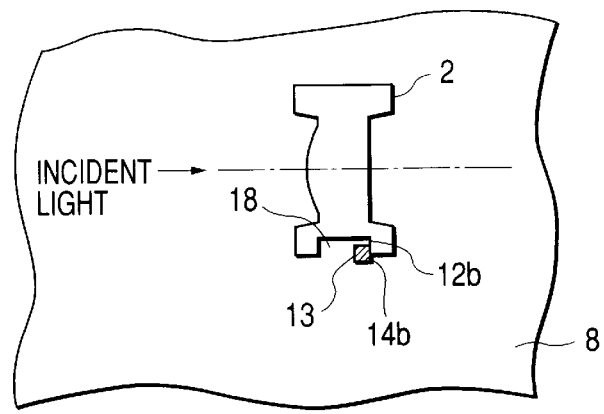

In this case, the following two adjustment positions can be set: the second adjustment position at which the positioning reference 12a on the incident surface side of the cylindrical lens 2 is in contact with the positioning portion 14a on the incident surface side of the optical frame 8, as shown in FIG. 12B; and the third adjustment position at which the positioning reference 12b of the exit surface side of the cylindrical lens 2 is in contact with the positioning portion 14b of the exit surface side of the optical frame 8, as shown in FIG. 12C. This makes it possible to adjust the cylindrical lens 2 by 1.0 mm from the initial position shown in FIG. 12A to either of the front and rear sides in the direction of the optical axis 9.

With this arrangement, an optical scanning device can be provided, which can adjust a spot size on a recording medium surface in the sub scanning direction to a desired value and always obtain an excellent image. In addition, with the use of the arrangement of this embodiment, since the positioning member 13 of the optical frame 8 does not protrude from the outer portion 11 of the cylindrical lens 2, a reduction space can be achieved, and hence a reduction in size can be effectively attained.

As described above, according to this embodiment, since the cylindrical lens 2 can be positioned within the range of its outer dimension, a reduction in space can be attained. In addition, since this arrangement allows an increase in the number of adjustment positions for the cylindrical lens 2 from the optical frame 8 side, high-precision adjustment can be realized.

Note that even if the recess portion 18 of the cylindrical lens 2 is formed in the upper or side surface of the cylindrical lens 2 on the drawing surface, the same effects as those of this embodiment can be obtained.

Fourth Embodiment

The fourth embodiment of the present invention will be described next.

This embodiment differs from the third embodiment in that a total of four positioning references 12a, 12b, 12c, and 12d of a cylindrical lens 2 in the direction of an optical axis 9 are formed on the front and rear side surfaces of a recess portion 18 in the direction of the optical axis 9 as in the third embodiment and outer portions 11 of the incident and exit surfaces, two positioning members 13a and 13b of the optical frame 8 are formed, and a total of four positioning portions 14a, 14b, 14c, and 14d are formed on the front and rear surfaces of the positioning members 13a and 13b in the direction of the optical axis 9. Other arrangements and optical functions are the same as those of the third embodiment, and hence the forth embodiment has the same effects as those of the third embodiment.

Figure 13A:
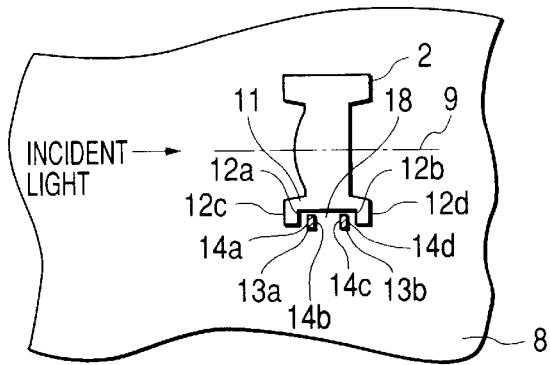
FIGS. 13A, 13B, 13C, 13D, 13E and 13F are schematic views showing adjustment positions in the fourth embodiment of the present invention.
Figure 13B:
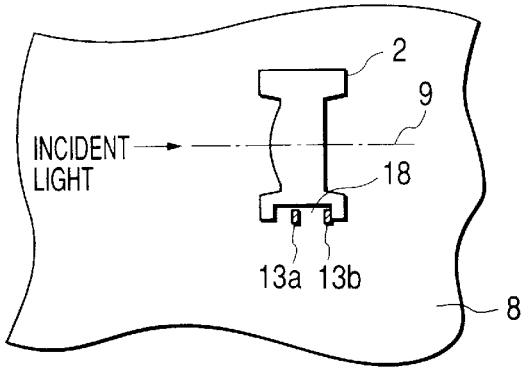
Figure 13C:
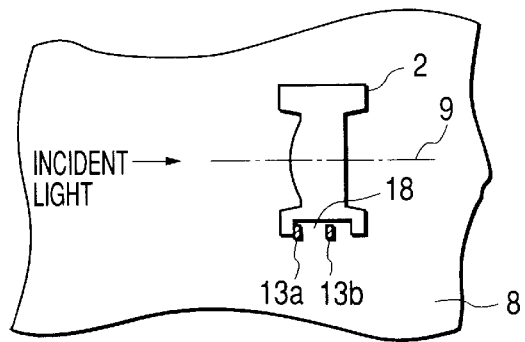
Figure 13D:
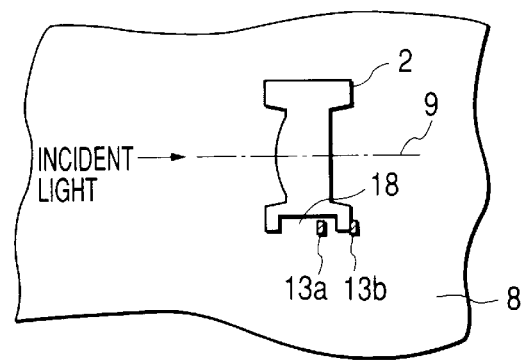
Figure 13E:
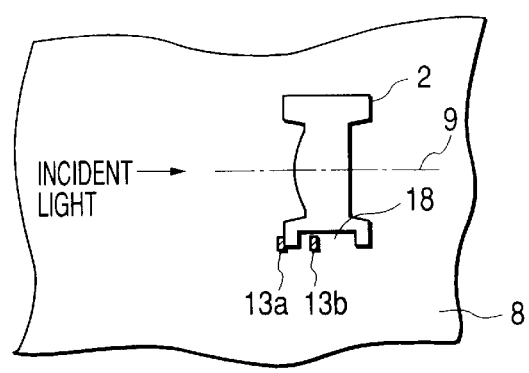
Figure 13F:
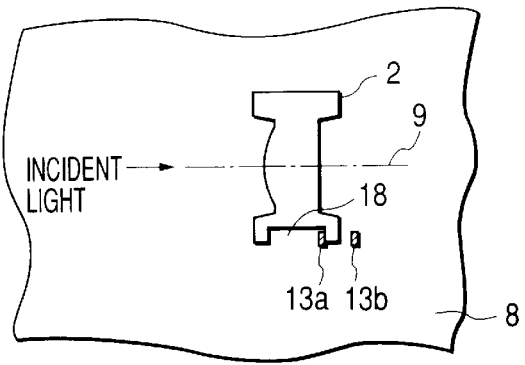
Figure 14A:
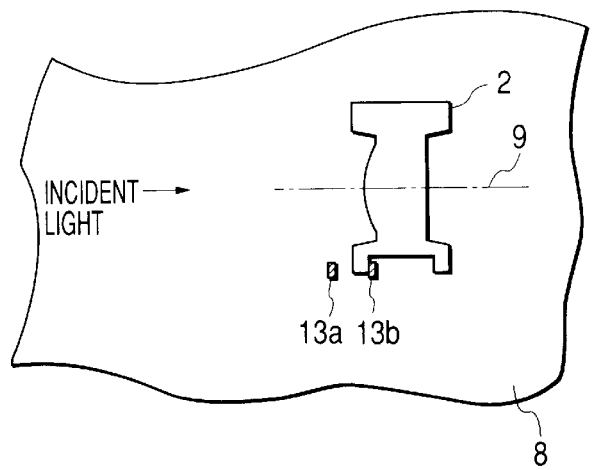
FIGS. 14A, 14B and 14C are schematic views showing adjustment positions in the fourth embodiment of the present invention.
Figure 14B:
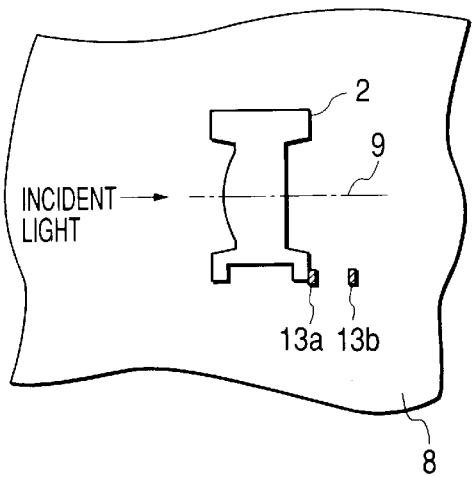
Figure 14C:
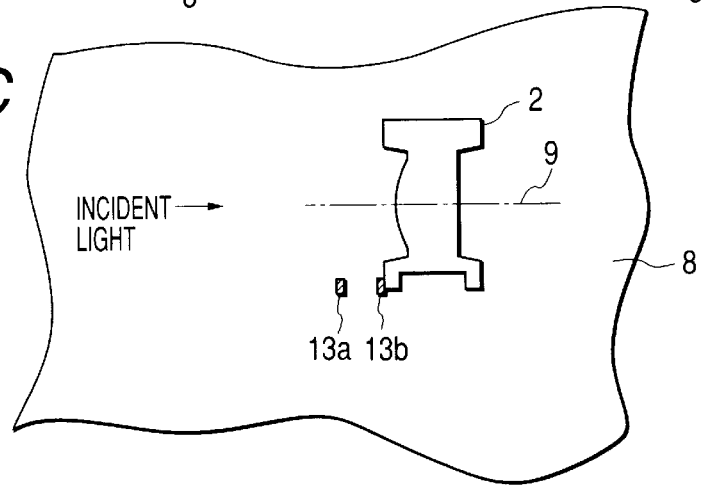

As in the first and second embodiments, in this embodiment, the cylindrical lens 2 is positioned to a position where it is not in contact with the positioning portions 14a, 14b, 14c, and 14d of the optical frame 8 by using a positioning tool (not shown), as shown in FIG. 13A. This position is the initial position. In this embodiment, the cylindrical lens 2 can be placed at the nine adjustment positions shown in FIGS. 13A to 13F and 14A to 14C, and is fixed to the optical frame 8 by using a known method, bonding or spring pressure after it is positioned to one of the adjustment positions so as to set a spot diameter on a recording medium surface in the sub scanning direction to a desired value.

As described above, according to this embodiment, as the number of positioning references 12 (12a to 12d) of the cylindrical lens 2 or the number of positioning portions 14 (14a to 14d) of the optical frame 8 is increased, the number of adjustment positions can be increased to the number of positioning references.

Fifth Embodiment

The fifth embodiment of the present invention will be described next.

This embodiment differs from the first embodiment in that positioning references 12 on outer portions 11 of the incident and exit surfaces of a cylindrical lens 2 are stepped in the main scanning direction and are formed in pairs on the respective outer portions 11 of the incident and exit surfaces. Other arrangements and optical functions are the same as those of the first embodiment, and hence the fifth embodiment has the same effects as those of the first embodiment.

Figure 15:
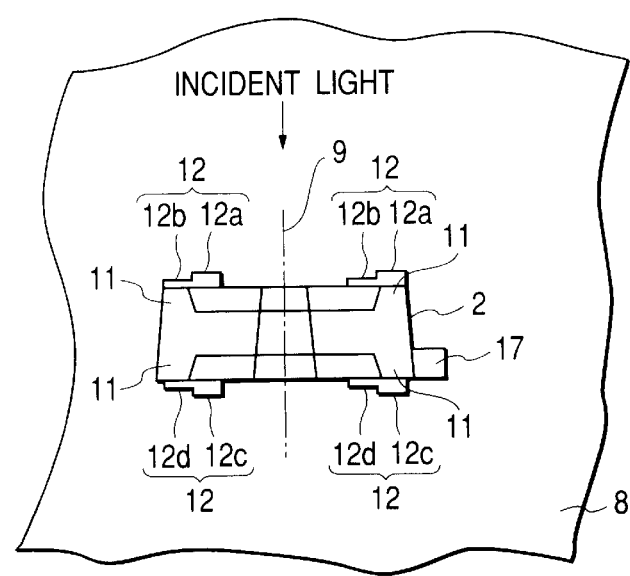
FIG. 15 is a schematic view of the main part of a cylindrical lens according to the fifth embodiment of the present invention.
Figure 16A:
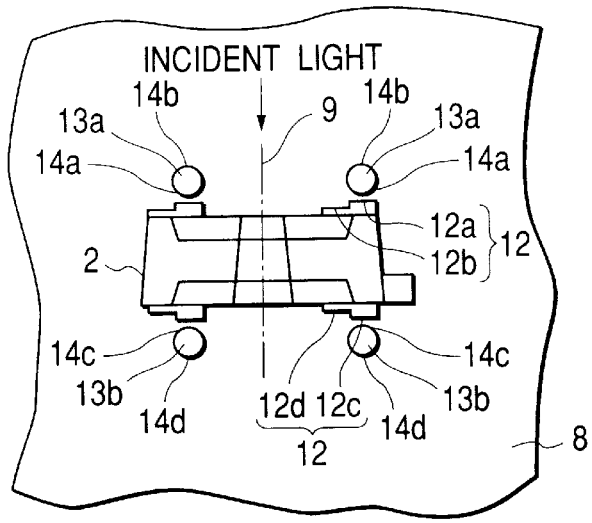
FIGS. 16A, 16B, 16C, 16D and 16E are schematic views showing adjustment positions in the fifth embodiment of the present invention.
Figure 16B:
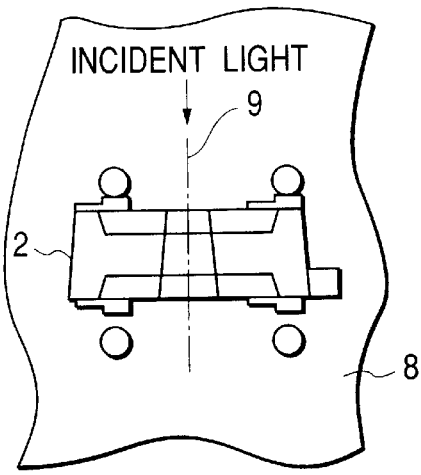
Figure 16C:
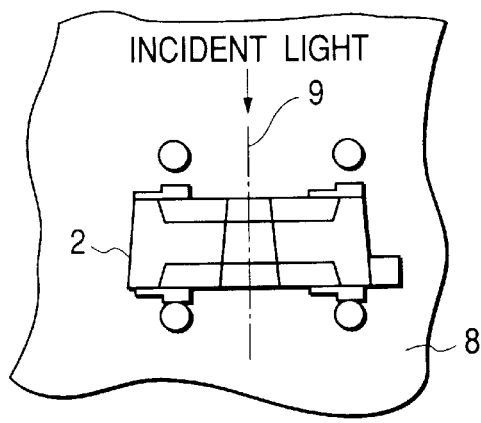
Figure 16D:
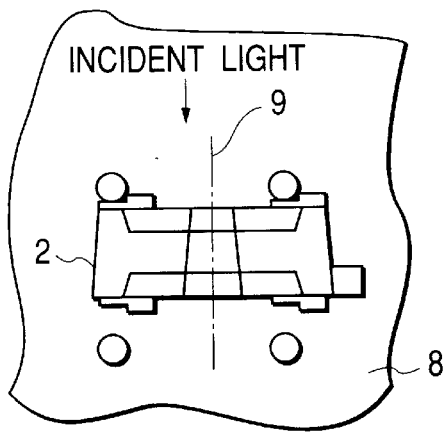
Figure 16E:
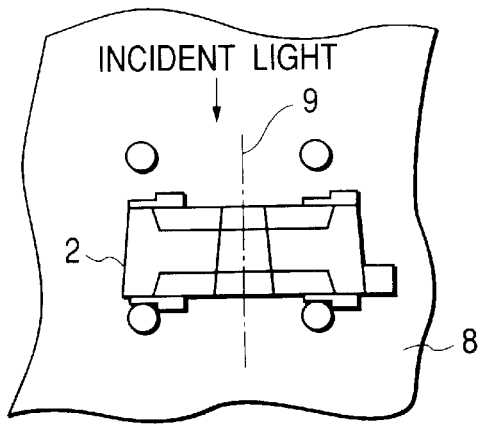
Figure 17A:
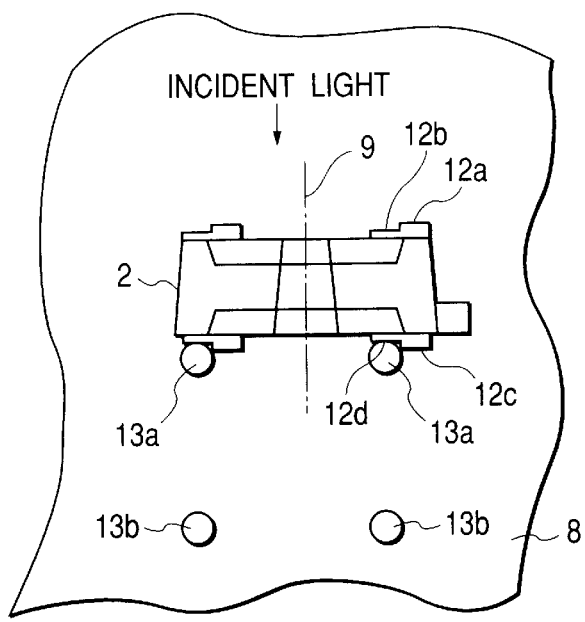
FIGS. 17A, 17B, 17C and 17D are schematic views showing adjustment positions in the fifth embodiment of the present invention.
Figure 17B:
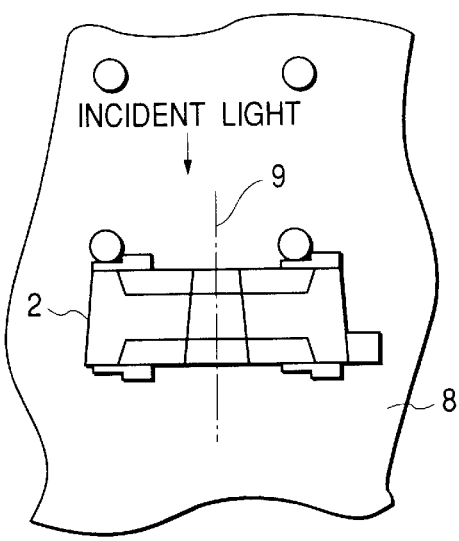
Figure 17C:
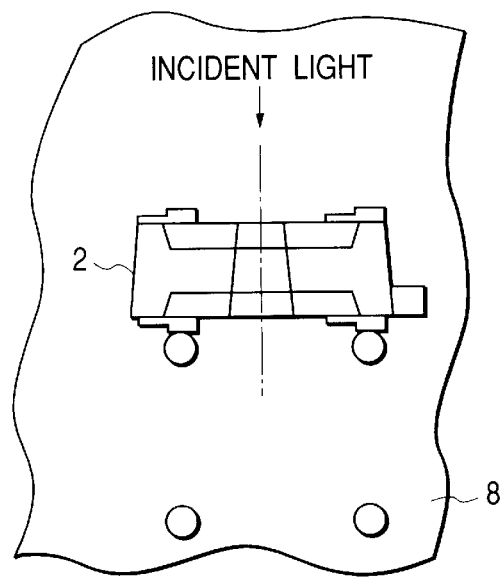
Figure 17D:
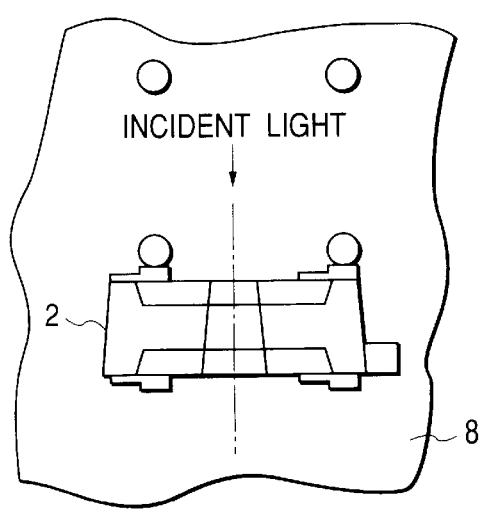

FIG. 15 is a sectional view of the main part of the cylindrical lens 2 according to this embodiment in the main scanning direction. Referring to FIG. 15, the positioning references 12 in the direction of an optical axis 9 are formed on the outer portions 11 of the incident surface of the cylindrical lens 2 in the form of steps in the main scanning direction (with no focusing function) to form two pairs of positioning references 12a and 12b in the direction of the optical axis 9. The positioning reference 12b is displaced by 0.5 mm from the positioning reference 12a to the polygon mirror side. Likewise, two pairs of positioning references 12c and 12d are formed on the exit surface side in the direction of the optical axis 9. The positioning reference 12d is displaced by 0.5 mm from the positioning reference 12c to the light source means side. In this case, the stepped shapes of the positioning references 12a, 12b, 12c, and 12d are asymmetrical with respect to the optical axis 9.

As in the first and second embodiments described above, in this embodiment, a positioning tool is used to position the cylindrical lens 2 to a position where it does not come into contact with positioning portions 14a, 14b, 14c, and 14d of an optical frame 8. This position is regarded as the initial position.

As shown in FIGS. 16A to 16E and 17A to 17D, in this embodiment, the cylindrical lens 2 can be positioned to a total of nine adjustment positions, i.e., the adjustment positions where the positioning references 12a, 12b, 12c, and 12d of the cylindrical lens 2 are respectively in contact with the positioning portions 14a, 14b, 14c, and 14d plus the initial position.

Referring to FIGS. 16A to 16E, five adjustment positions are set at a pitch of 0.5 mm, and hence it is obvious that adjustment can be made with considerably high precision by forming the positioning references 12 in the direction of the optical axis 9 in the form of steps. In this case, if the cylindrical lens 2 is positioned by using the positioning references 12b and 12d, the optical axis 9 of the cylindrical lens 2 becomes shifted to the main scanning direction. However, since the cylindrical lens 2 has a focusing effect in only the sub scanning direction but exert no effect in the main scanning direction, no influence is generated when the optical axis 9 of the cylindrical lens 2 becomes shifted to the main scanning direction. Therefore, forming the positioning references 12 of the cylindrical lens 2 into stepped shapes exerts no influence in the main scanning direction, thus allowing high-precision adjustment in the sub scanning direction.

As described above, in this embodiment, a larger number of adjustment positions can be set at a fine pitch as compared with each embodiment described above, and hence the cylindrical lens 2 can be adjusted with high precision.

In this embodiment, the positioning references 12 on the outer portions 11 of the incident and exit surfaces of the cylindrical lens 2 in the direction of the optical axis 9 are stepped in the main scanning direction to be formed in pairs on the respective outer portions 11 of the incident and exit surfaces. However, the present invention is not limited to this. If, for example, three or more pairs of stepped positioning references are formed, adjustment can be made with higher precision.

As described in the second and third embodiments, if a projection portion 17 or recess portion 18 is formed on or in the cylindrical lens 2, and the stepped positioning references 12 are formed, a better effect can be obtained.

Sixth Embodiment

The sixth embodiment of the present invention will be described next.

This embodiment differs from the first embodiment described above in that a cylindrical lens 2 and an imaging lens (BD lens) for synchronous detection, which guides a light beam to a synchronous detection means (BD sensor) are integrated into a composite lens 19, and the arrangement of the positioning members 13a and 13b of the optical frame 8 is changed. Other arrangements and optical functions are the same as those of the first embodiment, and hence the sixth embodiment has the same effects as those of the first embodiment.

Figure 18:
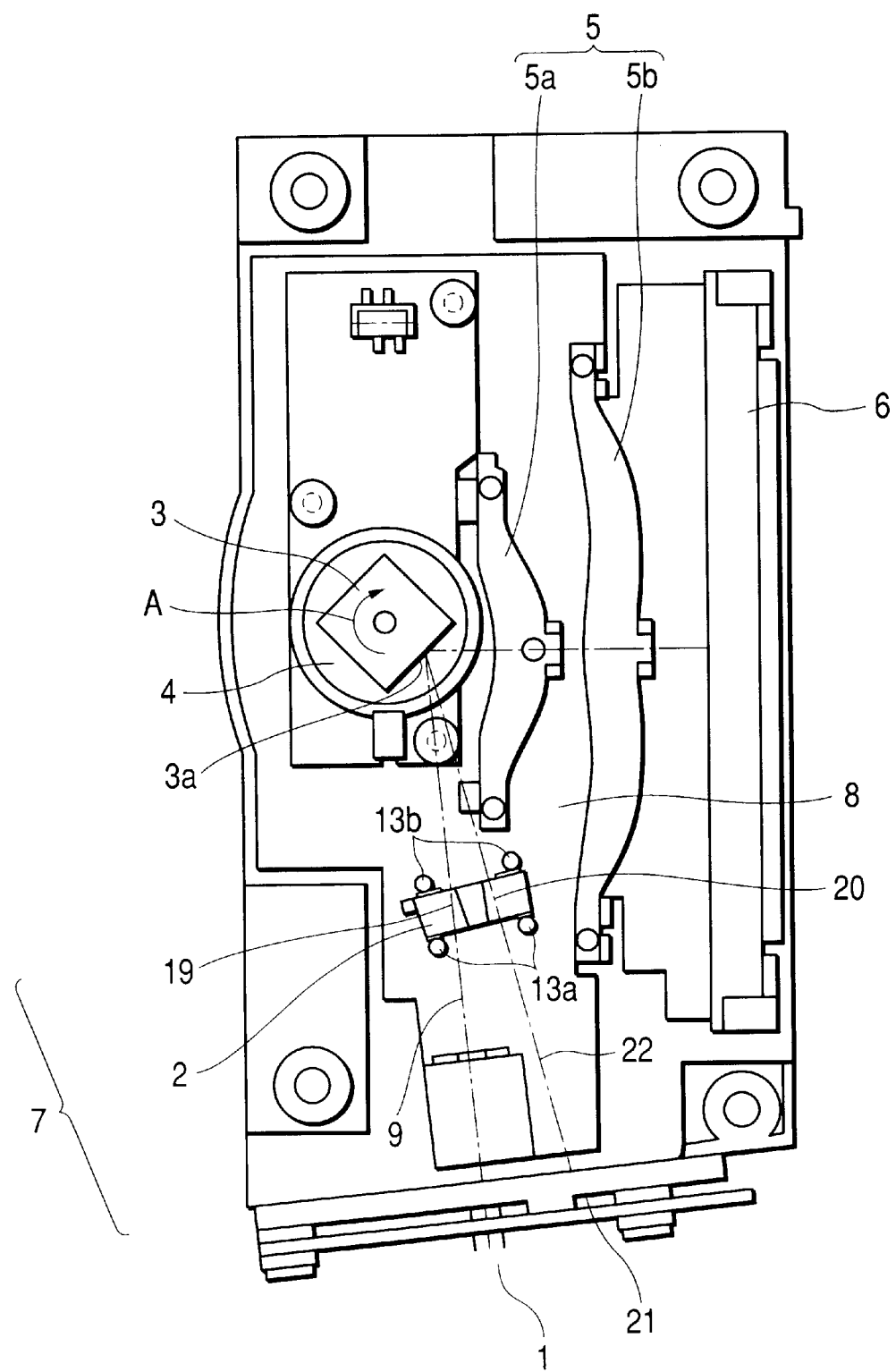
FIG. 18 is a schematic main scanning cross-sectional view of an optical scanning device according to the sixth embodiment of the present invention.

FIG. 18 is a sectional view of the main part of an optical scanning device according to this embodiment in the main scanning direction. The same reference numerals as in FIG. 18 denote the same elements in FIG. 1.

Referring to FIG. 18, the light beam emitted from a light source means 1 is converted into a substantially parallel light beam by a condenser lens (not shown). The light beam is then converged only in the sub scanning direction by the cylindrical lens 2 which is part of the composite lens 19 and incident on a polygon mirror 3. The light beam reflected/deflected by the polygon mirror 3 is formed into an image on a photosensitive drum (recording medium surface (not shown) by two f-θ lenses 5a and 5b constituting a second imaging optical system 5. By rotating the polygon mirror 3 in the direction indicated by the arrow A using a driving means 4, this light beam is scanned on the photosensitive drum surface.

Part of the light beam reflected/deflected by the polygon mirror 3 is guided to synchronous detection means (BD sensor) 21 via the imaging lens (BD lens) 20 for synchronous detection without passing through the f-θ lenses 5a and 5b.

Figure 19A:
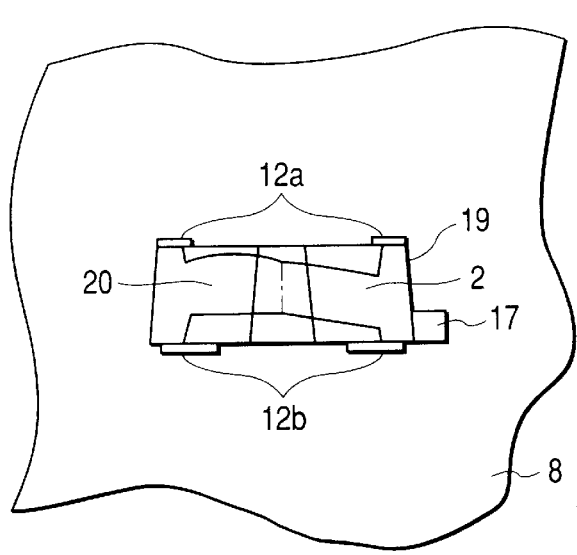
FIGS. 19A, 19B and 19C are schematic views of the main part of a cylindrical lens according to the sixth embodiment of the present invention.
Figure 19B:
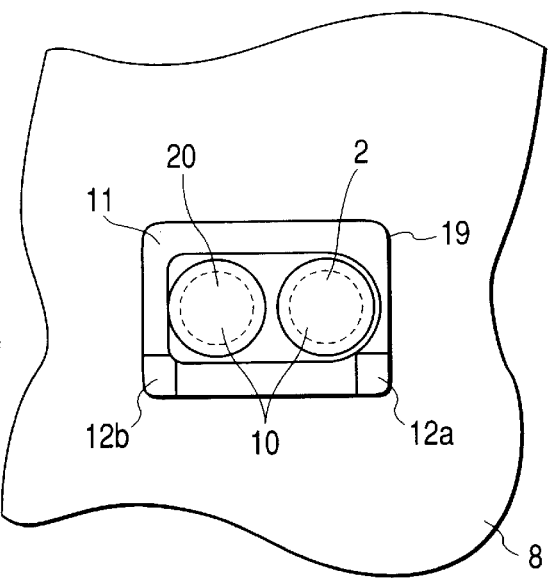
Figure 19C:
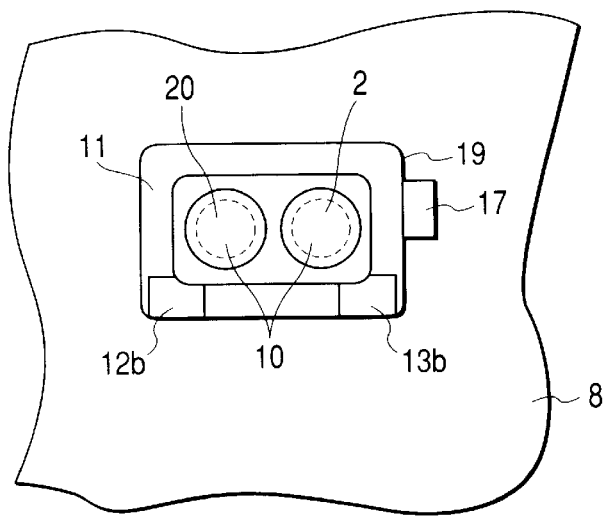

FIGS. 19A to 19C are sectional views of the composite lens 19 in this embodiment. FIG. 19A is a sectional view of the main part of the composite lens 19 in the main scanning direction. FIG. 19B is a sectional view of the main part on the incident surface side. FIG. 19C is a sectional view of the main part on the exit surface side. The same reference numerals as in FIGS. 19A to 19C denote the same elements in FIG. 2A.

In this embodiment, a gate 17 is formed as a protruding portion (projection portion) on a side surface of the composite lens 19. The cylindrical lens 2 is placed on the gate 17 side, and the BD lens 20 is placed on the opposite side to the gate 17. The two lenses 2 and 20 are integrated into the composite lens 19.

Figure 20A:
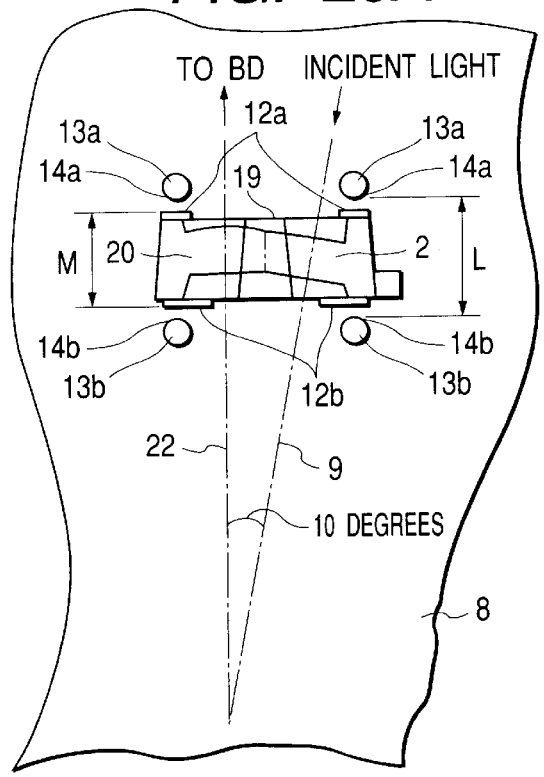
FIGS. 20A, 20B and 20C are schematic views showing adjustment positions in the sixth embodiment of the present invention.

FIG. 20A is a sectional view of the main part of the composite lens 19 in this embodiment in the main scanning direction. As shown in FIG. 20A, the composite lens 19 is placed between two positioning members 13a and 13b by using a positioning tool (not shown) such that it does not come into contact with positioning portions 14a and 14b of an optical frame 8, as in the first and second embodiments. The optical axis 9 of the cylindrical lens 2 and an optical axis 22 of the BD lens 20 define an angle of 10°. Note that FIG. 20A shows the first adjustment position.

The cylindrical lens 2 has a focusing effect only in the sub scanning direction, but the BD lens 20 has a focusing effect both in the main scanning direction and sub scanning direction. If the optical axis of the BD lens 20 shifts in the main scanning direction, the timing of synchronous detection changes. As a result, the write position on the photosensitive drum surface shifts. For this reason, the composite lens 19 is adjusted in the direction of the optical axis 22 of the BD lens 20. In accordance with this adjustment, the optical axis 9 of the cylindrical lens 2 shifts in the main scanning direction. However, there is no influence on optical characteristics because the cylindrical lens 2 has no focusing effect in the main scanning direction.

Figure 20B:
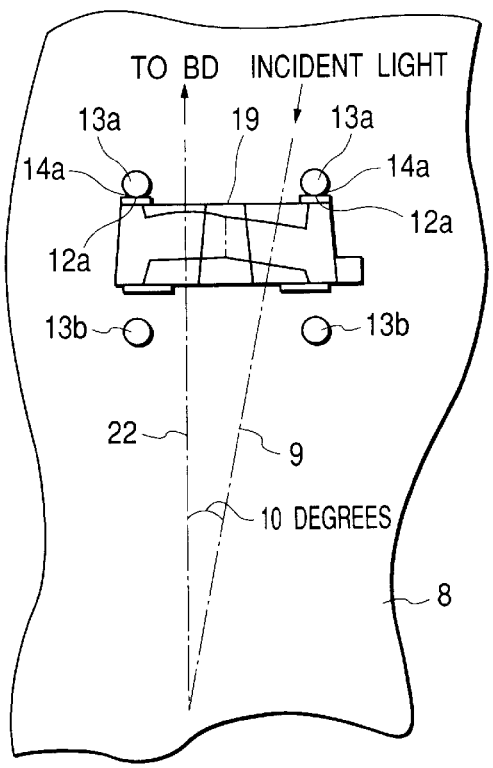
Figure 20C:
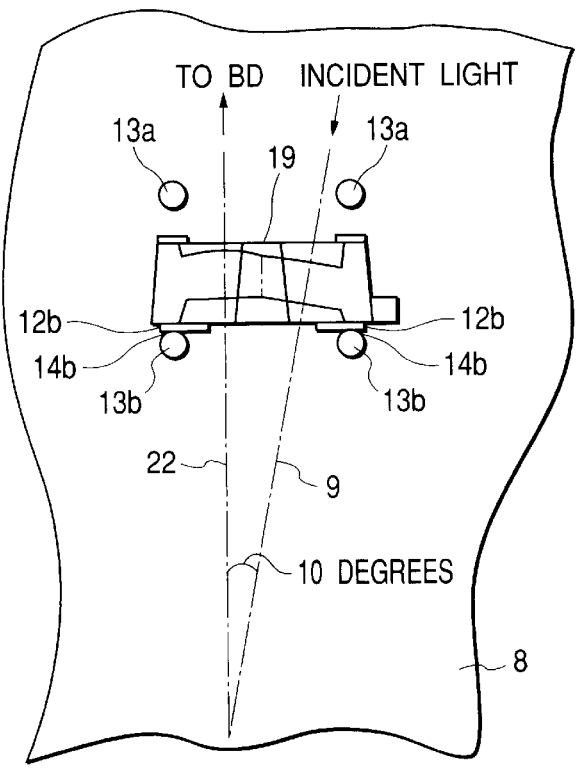

In this case, an interval L between the positioning portions 14a and 14b of the optical frame 8 in the direction of the optical axis 22 of the BD lens is 3.7 mm, which is larger than interval M=3.3 mm between the positioning references 12a and 12b of the composite lens 19 in the direction of the optical axis 22 of the BD lens (L>M). In addition, the composite lens 19 can be positioned to the second adjustment position shown in FIG. 20B at which the positioning reference 12a of the composite lens 19 is in contact with the positioning portion 14a of the optical frame 8, and the third adjustment position shown in FIG. 20C at which the positioning reference 12b of the composite lens 19 is in contact with the positioning portion 14b of the optical frame 8. Therefore, the composite lens 19 can be adjusted forward and backward by 0.2 mm each in the direction of the optical axis 22 of the BD lens. Furthermore, since the cylindrical lens 2 can be moved in the direction of the optical axis 9 of the cylindrical lens 2, a spot diameter on a recording medium surface in the sub scanning direction can be adjusted to a desired size as in the first embodiment.

By integrating the cylindrical lens 2 and BD lens 20 into one composite lens 19, the cost of the optical scanning device can be reduced. In addition, by adjusting the composite lens 19 in the direction of the optical axis 22 of the BD lens 20, a spot diameter on a recording medium surface in the sub scanning direction can be adjusted, thereby providing an optical scanning device capable of obtaining high-quality images.

As described above, according to this embodiment, by integrating the cylindrical lens 2 and synchronous detection lens 20 into the composite lens 19, a reduction in cost can be achieved, and the cylindrical lens can be easily adjusted without any error in synchronous detection.

Although each embodiment of the present invention has been described by taking a cylindrical lens as an example, the present invention is not limited to this. For example, the effects of the present invention can also be obtained in the f-θ lens as an element of the second imaging optical system, an imaging mirror, an optical element having a focusing effect only in one direction (sagittal or meridional direction), a plane mirror which has no focusing effect but can change an optical path length, and the like.

Seventh Embodiment

Figure 21:
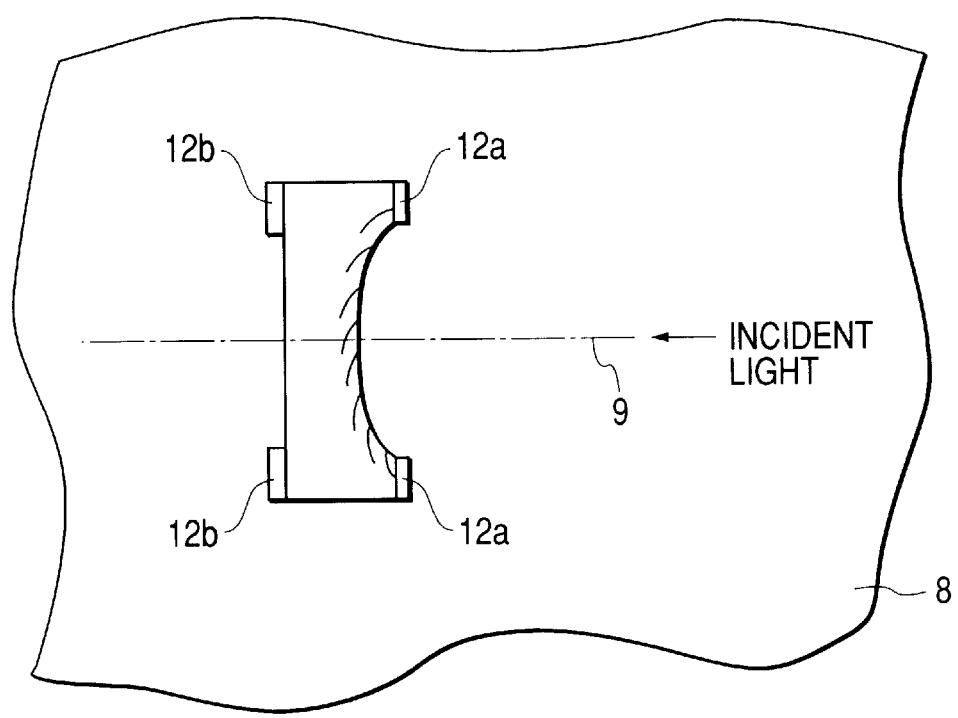
FIG. 21 is a schematic view showing an optical element (mirror) in the seventh embodiment of the present invention.

FIG. 21 is a sectional view of the main part of the seventh embodiment of the present invention using a reflecting mirror as an optical element having a plurality of positioning references.

This embodiment differs from the first embodiment in that a reflecting mirror (cylindrical mirror) is used as an optical element instead of the cylindrical lens 2 and applied to the present invention. A semiconductor laser 1 serving as a light source means, a collimator lens (not shown), and a stop (not shown) are moved to positions where the light beam emitted from the semiconductor laser 1 can strike a reflection surface of the reflecting mirror (cylindrical mirror). However, Other arrangements and optical functions are the same as those of the first embodiment, and hence the seventh embodiment has the same effects as those of the first embodiment.

Referring to FIG. 21, each of positioning references 12a and 12b is used for positioning in the direction of an optical axis 9. The positioning references 12a and 12b define the reflecting mirror at different positions in the direction of the optical axis 9. As a reflecting mirror, a plane mirror having no power may be used in place of a curved mirror having a power.

In the case of a reflecting mirror, there are no such concepts as incident and exit surfaces. If, therefore, positioning references are formed on the front side (incident surface side) and the rear side (opposite side to the incident surface) in the optical axis direction, the same effects as those of this embodiment can be obtained.

Image Forming Apparatus

Figure 22:
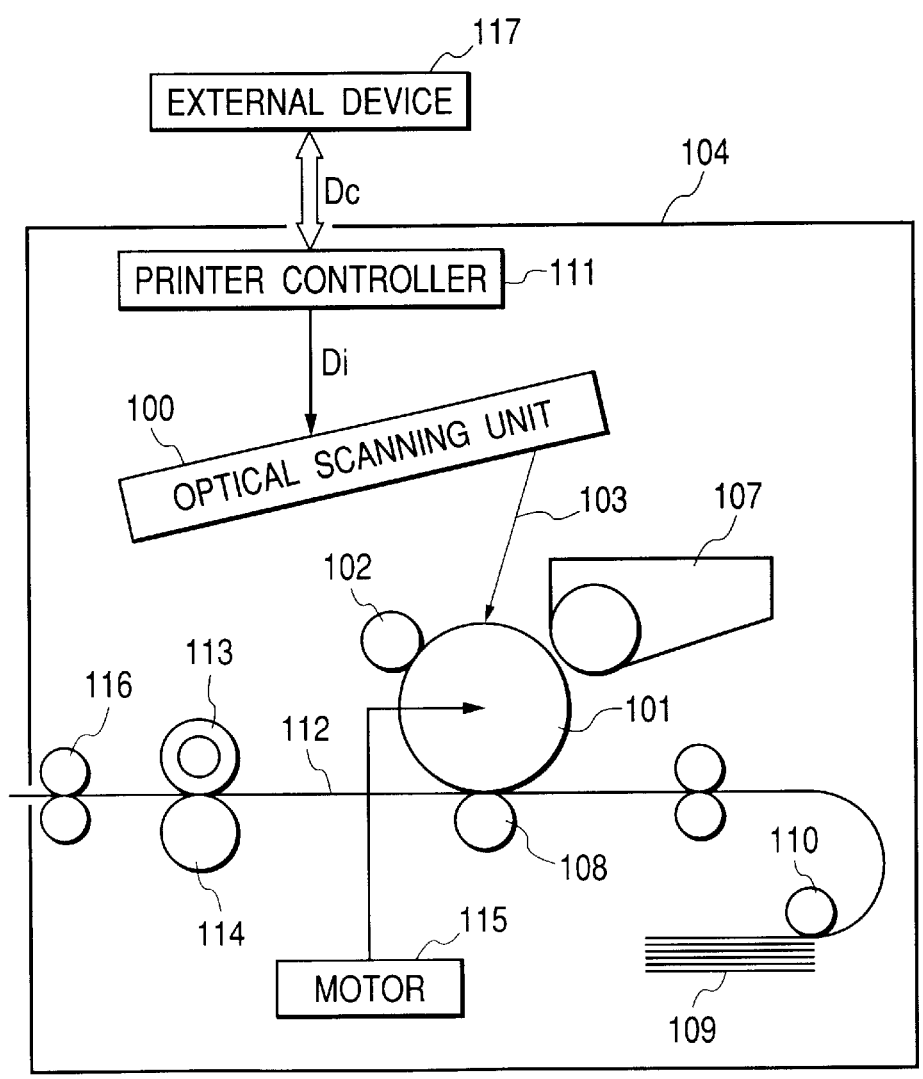
FIG. 22 is a sub scanning cross-sectional view of the main part of an arrangement of an image forming apparatus (electrophotographic printer) using the optical scanning device of the present invention.
Figure 23:
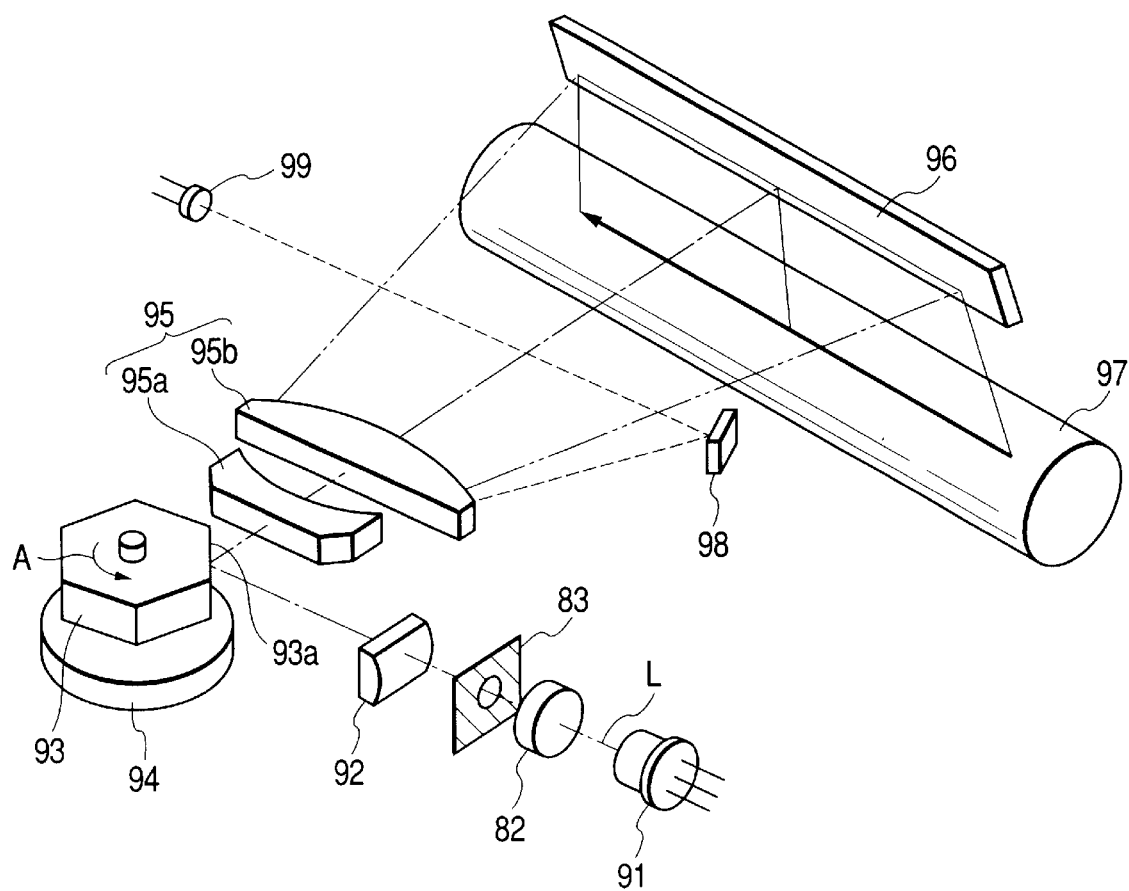
FIG. 23 is a schematic view of the main part of a conventional optical scanning device.

FIG. 22 is a sectional view of the main part of an embodiment of an image forming apparatus (electrophotographic printer) using a scanning optical device including one of the optical elements according to the first to seventh embodiments described above. Referring to FIG. 22, an image forming apparatus 104 receives code data Dc from an external device 117 such as a personal computer. A printer controller 111 in the apparatus converts this code data Dc into image data (dot data) Di. This image data Di is input to an optical scanning unit 100. A light beam 103 modulated in accordance with the image data Di then emerges from the optical scanning unit (scanning optical device) 100. The photosensitive surface of a photosensitive drum 101 is scanned with this light beam 103 in the main scanning direction.

The photosensitive drum 101 serving as an electrostatic latent image carrier (photosensitive member) is rotated clockwise by a motor 115. Upon this rotation, the photosensitive surface of the photosensitive drum 101 moves relative to the light beam 103 in the sub scanning direction perpendicular to the main scanning direction. A charge roller 102 for uniformly charging the surface of the photosensitive drum 101 is placed above the photosensitive drum 101 so as to come into contact with its surface. The surface of the photosensitive drum 101 charged by the charge roller 102 is irradiated with the light beam 103 scanned by the optical scanning unit 100.

As described above, the light beam 103 is modulated on the basis of the image data Di. When the surface of the photosensitive drum 101 is irradiated with this light beam 103, an electrostatic latent image is formed on the surface. This electrostatic latent image is developed into a toner image by a developing unit 107 that is placed on the downstream side in the rotating direction of the photosensitive drum 101 relative to the irradiation position of the light beam 103 so as to come into contact with the photosensitive drum 101.

The toner image developed by the developing unit 107 is transferred onto a paper sheet 112 as a transfer material by a transfer roller 108 placed below the photosensitive drum 101 to oppose it. The paper sheet 112 is stored in a paper cassette 109 in front of the photosensitive drum 101 (on the right side in FIG. 22). However, this sheet can also be manually fed. A feed roller 110 is placed at an end portion of the paper cassette 109 to feed the paper sheet 112 in the paper cassette 109 onto the convey path.

The paper sheet 112 onto which the unfixed toner image is transferred in the above manner is further conveyed to the fixing unit behind the photosensitive drum 101 (on the left side in FIG. 22). The fixing unit is comprised of a fixing roller 113 having a fixing heater (not shown) inside and a press roller 114 pressed against the fixing roller 113. The paper sheet 112 conveyed from the transfer unit is heated while being pressed by the press portion between the fixing roller 113 and the press roller 114 to fix the unfixed toner image on the paper sheet 112. In addition, paper discharge rollers 116 are placed behind the fixing roller 113 to discharge the image bearing paper sheet 112 outside the image forming apparatus.

Although not shown in FIG. 22, the printer controller 111 controls the respective units in the image forming apparatus, e.g., the motor 115, the polygon motor in the optical scanning unit 100, and the like as well as data conversion described above.

According to the present invention, as described above, there are provided an optical element and an optical scanning device using the element, in which focus adjustment for the optical element can be simplified by forming, on at least one of the optical elements included in the first and second imaging optical systems, a plurality of sets of positioning references for defining the position of the optical element in the optical axis direction, and a reduction in assembly cost can be attained by shortening the adjustment time.

What is claimed is:

1. An optical scanning device comprising:
    light source;
    a first imaging optical system which focuses a light beam emitted from said light source;
    deflection for causing a deflection surface to deflect a light beam passing through said first imaging optical system; and
    a second imaging optical system which optically scans the deflected light beam on a scanning target surface and forms the light beam into an image as a spot on the scanning target surface,
    wherein at least one lens included in said first and second imaging optical systems has a plurality of positioning references for defining a position of said optical element in the optical axis direction, said positioning references being formed on a plurality of surfaces at different positions in optical axis direction.

2. A device according to claim 1, wherein said positioning references of said at least one lens are formed on front and rear surfaces in the optical axis direction.

3. A device according to claim 1, wherein said at least one lens further comprises a projection portion on an outer portion formed outside an effective portion, and surfaces of the projection portion which is located on front and rear sides in the optical axis direction form the positioning references.

4. A device according to claim 1, wherein an optical frame which houses said first imaging optical system or/and said second imaging optical system has a plurality of positioning portions corresponding to the positioning references of said at least one lens, and an interval between the positioning portions of said optical frame in the optical axis direction of said at least one lens is larger than an interval between the positioning references of said at least one lens in the optical axis direction.

5. A device according to claim 1, wherein said at least one lens has a recess portion in an outer portion formed outside an effective portion, and surfaces of said recess portion which are located on front and rear sides in the optical direction form the positioning references.

6. A device according to claim 1, wherein an optical frame which houses said first imaging optical system or/and said second imaging optical system has a plurality of positioning portions corresponding to the positioning references of said at least one lens, and an interval between the positioning portions of said optical frame in the optical axis direction of said at least one lens is smaller than an interval between the positioning references of said at least one lens in the optical axis direction.

7. A device according to claim 1, wherein said at least one lens is positioned to a position where one of said plurality of positioning references for defining a position of said at least one lens in the optical axis direction is in contact with one of a plurality of positioning portions of an optical frame which houses at least one of said first imaging optical system and said second imaging optical system or a position where the other of said plurality of positioning references is not in contact with the positioning portions of said optical frame.

8. A device according to claim 7, wherein said at least one lens is placed between said plurality of sets of positioning portions of said optical frame.

9. A device according to claim 1, wherein the positioning reference also serves as a contact surface of a positioning tool.

10. A device according to claim 1, wherein said at least one lens is made of a synthetic resin material.

11. A device according to claim 1, wherein said at least one lens has a plurality of sets of positioning references, each constituted by two reference surfaces that define said optical element at the same position in the optical axis direction.

12. A device according to claim 1, wherein said at least one lens has a focusing effect only in one of a main scanning direction and a sub scanning direction.

13. A device according to claim 12, wherein said at least one lens has a focusing effect only in one of the main scanning direction and the sub scanning direction, and a positioning reference of said at least one lens is formed into a stepped shape in a direction in which said at least one lens has no focusing effect.

14. An optical scanning device comprising:
    light source;
    a first imaging optical system which focuses a light beam emitted from said light source;
    deflection means for causing a deflection surface to deflect a light beam passing through said first imaging optical system; and
    a second imaging optical system which optically scans the deflected light beam on a scanning target surface and forms the light beam into an image as a spot on the scanning target surface,
    wherein one of lenses constituting said first and second imaging optical systems has, on light incident and exit surfaces of said lens, positioning references for defining a position of said lens in the optical axis direction.

15. A device according to claim 14, further comprising an optical frame which houses said first imaging optical system or/and said second imaging optical system, wherein said optical frame has positioning portions corresponding to the positioning references of said lens on front and rear sides in a direction of an optical axis of said lens, and an interval between the positioning portions of said optical frame in the direction of the optical axis of said lens is larger than an interval between the positioning references of said lens in the optical axis direction.

16. A device according to claim 15, wherein said lens is positioned such that the positioning reference which is formed on a light incident surface side of said lens and defines a position in the direction of the optical axis of said lens is in contact with the positioning portion of said optical frame on the light incident surface side, positioned such that the positioning reference which is formed on the light exit surface side and defines a position in the direction of the optical axis of said lens is in contact with the positioning portion of said optical frame on the light exit surface side, or positioned between the positioning portions on the light incident and exit surface sides without contacting the positioning portions of said optical frame.

17. A device according to claim 14, wherein said lens is made of a synthetic resin material.

18. A device according to claim 14, wherein said lens comprises, on the light incident and exit surface sides of said lens, two pairs of positioning references for defining a position in the direction of the optical axis of said lens.

19. A device according to claim 14, wherein said lens has a focusing effect only in one of the main scanning direction and the sub scanning direction.

20. A device according to claim 19, wherein said lens is formed by a composite lens obtained by integrating a cylindrical lens having a focusing effect only in the sub scanning direction and a synchronous detection lens which guides a light beam to synchronous detection means, and the positioning reference positions said composite lens in a direction parallel to the direction of the optical axis of the synchronous detection lens of said composite lens.

21. An image forming apparatus comprising:
  said optical scanning device defined in any one of claims 1 to 20,
  a photosensitive member placed on the scanning target surface;
  a developing unit which develops an electrostatic latent image formed on said photosensitive member by a light beam scanned by said optical scanning device into a toner image;
  a transfer unit which transfers the developed toner image onto a transfer material; and
  a fixing unit which fixes the transferred toner image on the transfer material.

22. An image forming apparatus comprising said optical scanning device defined in any one of claims 1 to 24, and a printer controller which converts code data input from an external device into an image signal and inputs the signal to said optical scanning device.

23. An optical scanning device comprising:
  light source;
  a first imaging optical system which focuses a light beam emitted from said light source;
  deflection means for causing a deflection surface to deflect a light beam passing through said first imaging optical system; and
  a second imaging optical system which optically scans the deflected light beam on a scanning target surface and forms the light beam into an image as a spot on the scanning target surface,
  wherein at least one of optical elements included in said first and second imaging optical systems has at least two positioning references formed on a plurality of surfaces which differ in position in the optical axis direction, for defining a position of said optical element in the optical axis direction.

24. A device according to claim 23, wherein said positioning references of said optical element are formed on front and rear surfaces in the optical axis direction.

25. A device according to claim 23, wherein an optical frame which houses at least one of said first imaging optical system and said second imaging optical system has at least two of positioning portions corresponding to the positioning references of said optical element,
  wherein said optical element is positioned to a position where the first positioning reference of said at least two positioning references is in contact with the first positioning portion of plurality of positioning portions of said optical frame and a position where the first positioning reference of said at least two of positioning references is not in contact with the second positioning portion of plurality of positioning portions of said optical frame.

26. A device according to claim 25, wherein said optical element is placed between two positioning portions of said optical frame.

27. A device according to claim 25, wherein said optical element is made of a synthetic resin material.

28. A device according to claim 23, wherein said positioning references of said optical element are formed on the surfaces of the light incident and exit surface sides in the optical axis.

29. A device according to claim 28, wherein said optical element is positioned (i) such that the positioning reference, which is formed on a light incident surface side of said optical element and defines a position in the direction of the optical axis of said optical element, is in contact with the positioning portion of said optical frame on the light incident surface side, (ii) such that the positioning reference, which is formed on the light exit surface side and defines a position in the direction of the optical axis of said optical element, is in contact with the positioning portion of said optical frame on the light exit surface side, or (iii) between the positioning portions on the light incident and exit surface sides without contacting the positioning portions of said optical frame.

30. A device according to claim 29, wherein said optical element comprises, on the light incident and exit surface sides of said optical element, two pairs of positioning references for defining a position in the direction of the optical axis of said optical element.

31. An image forming apparatus comprising:
  said optical scanning device defined in any one of claims 23, 25 and 29;
  a photosensitive member placed on the scanning target surface;
  a developing unit which develops an electrostatic latent image formed on said photosensitive member by a light beam scanned by said optical scanning device into a toner image;
  a transfer unit which transfers the developed toner image onto a transfer material; and
  a fixing unit which fixes the transferred toner image on the transfer material.

32. An image forming apparatus comprising said optical scanning device defined in claim 31, and a printer controller which converts code data input from an external device into an image signal and inputs the signal to said optical scanning device.

* * * * *

UNITED STATES PATENT AND TRADEMARK OFFICE
CERTIFICATE OF CORRECTION

PATENT NO.    : 6,785,030 B2
DATED         : August 31, 2004
INVENTOR(S)   : Keiichiro Ishihara It is certified that error appears in the above-identified patent and that said Letters Patent is hereby corrected as shown below:

Column 1,
Line 39, "comprising" should read -- comprised --.
Line 65, "a incident" should read -- an incident --.

Column 2,
Line 18, "prolongs," should read -- is prolonged --.

Column 3,
Line 1, "or/and" should read -- and/or --.
Line 15, "or/and" should read -- and/or --.

Column 4,
Line 3, "or/and" should read -- and/or --.

Column 10,
Line 47, "13b ." should read -- 13b. --.

Column 15,
Line 55, "Other" should read -- other --.

Column 17,
Lines 41 and 55, "or/and" should read -- and/or --.

Column 18,
Line 45, "or/and" should read -- and/or --.

UNITED STATES PATENT AND TRADEMARK OFFICE
CERTIFICATE OF CORRECTION

PATENT NO.    : 6,785,030 B2
DATED         : August 231, 2004
INVENTOR(S)   : Keiichiro Ishihara It is certified that error appears in the above-identified patent and that said Letters Patent is hereby corrected as shown below:

Column 19,
Line 31, "1-24," should read -- 1-20, --.

Signed and Sealed this

Fourth Day of January, 2005

JON W. DUDAS
*Director of the United States Patent and Trademark Office*